United States Patent
Aikawa et al.

(10) Patent No.: US 11,182,561 B2
(45) Date of Patent: Nov. 23, 2021

(54) DATA ANALYZER AND DATA ANALYSIS METHOD

(71) Applicant: Mitsubishi Electric Corporation, Tokyo (JP)

(72) Inventors: Takeyuki Aikawa, Tokyo (JP); Hiroyasu Itsui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 232 days.

(21) Appl. No.: 16/476,163

(22) PCT Filed: Feb. 14, 2017

(86) PCT No.: PCT/JP2017/005292
§ 371 (c)(1),
(2) Date: Jul. 5, 2019

(87) PCT Pub. No.: WO2018/150453
PCT Pub. Date: Aug. 23, 2018

(65) Prior Publication Data
US 2019/0354589 A1    Nov. 21, 2019

(51) Int. Cl.
*G06F 40/30*  (2020.01)
*G06N 20/00*  (2019.01)
*G06F 40/247* (2020.01)
*G06F 40/253* (2020.01)

(52) U.S. Cl.
CPC ......... *G06F 40/30* (2020.01); *G06F 40/247* (2020.01); *G06F 40/253* (2020.01); *G06N 20/00* (2019.01)

(58) Field of Classification Search
None
See application file for complete search history.

(56) References Cited

U.S. PATENT DOCUMENTS

2008/0256329 A1* 10/2008 Heinze ............... G06F 16/3347
712/4

FOREIGN PATENT DOCUMENTS

JP    2016-161968 A    9/2016

OTHER PUBLICATIONS

Kaji et al. "Recent Research Trends in Japanese Morphological Analysis and Its Related Areas", Journal of Japan Society for Fuzzy Theory and Intelligent Informatics, vol. 25, No. 6, (2013), pp. 174-183.
Kim et. al. "Deriving adjectival scales from continuous space word representations", Proceedings of the 2013 Conference on Empirical Methods in Natural Language Processing, pp. 1625-1630.

(Continued)

*Primary Examiner* — Quynh H Nguyen
(74) *Attorney, Agent, or Firm* — Birch, Stewart, Kolasch & Birch, LLP

(57) ABSTRACT

A similar expression collecting unit (103) collects a word/phrase of an expression similar to an analysis viewpoint word/phrase and a word embedding corresponding the word/phrase from distributed representations of words data. A dimension selecting unit (104) selects a dimension of a word embedding depending on the analysis viewpoint word/phrase, and compresses a word embedding corresponding to the word/phrase collected by the similar expression collecting unit (103) in the selected dimension.

8 Claims, 25 Drawing Sheets

(56) References Cited

OTHER PUBLICATIONS

Mikolov et. al. "Efficient Estimation of Word Representations in Vector Space", Proceedings of Workshop at ICLR, Sep. 7, 2013, p. 1-12.
Saito et al. "Problems in applications of multidimensional scaling-from the standpoint of data analysis", Behavior Metrology, vol. 4, No. 2, (1977), p. 1-13.
Shime et. al. "Automatic Detection of Japanese Compound Functional Expressions and its Application to Statistical Dependency Analysis", Natural Language Processing, vol. 14, No. 5, (2007), pp. 167-197.

* cited by examiner

FIG. 6A

Input Of Analysis Condition

| | |
|---|---|
| Analysis Viewpoint Word/Phrase 1 | Hot (a1) |
| Analysis Viewpoint Word/Phrase 2 | Cold (a2) |
| Analysis Viewpoint Word/Phrase 3 | |
| Analysis Viewpoint Word/Phrase 4 | |

FIG. 6B

Input Of Analysis Condition

| | | Number Of Target Words | Target Word Similarity |
|---|---|---|---|
| Analysis Viewpoint Word/Phrase 1 | Spring (b1) | | |
| Analysis Viewpoint Word/Phrase 2 | Summer (b2) | 100 | |
| Analysis Viewpoint Word/Phrase 3 | Autumn (b3) | | 0.8 |
| Analysis Viewpoint Word/Phrase 4 | Winter (b4) | 100 | 0.7 |

FIG. 6C

Input Of Analysis Condition

| | a1 a2 | c1 c2 | d1 d2 |
|---|---|---|---|
| Analysis Viewpoint Word/Phrase Group 1 | Hot | Very-Hot | A Little-Hot |
| Analysis Viewpoint Word/Phrase Group 2 | Cold | Very-Cold | A Little-Cold |
| Analysis Viewpoint Word/Phrase Group 3 | | | |
| Analysis Viewpoint Word/Phrase Group 4 | | | |

| ID | Header | Word Embedding |
|---|---|---|
| 1 | Hot | $W[1] = (v[1,1], v[1,2], \cdots, v[1,N])$ |
| 2 | Cold | $W[2] = (v[2,1], v[2,2], \cdots, v[2,N])$ |
| : | : | : |
| 150 | Very-Hot | $W[150] = (v[150,1], v[150,2], \cdots, v[150,N])$ |
| : | : | : |
| i | T[i] | $W[i] = (v[i,1], v[i,2], \cdots, v[i,N])$ |
| : | : | : |

| Header | Word Embedding | Similarity |
|---|---|---|
| Very-Hot | W[150] = (v[150,1], v[150,2], ···, v[150,N]) | 0.8 |
| ⋮ | ⋮ | ⋮ |
| Very-Cold | W[200] = (v[200,1], v[200,2], ···, v[200,N]) | 0.75 |
| ⋮ | ⋮ | ⋮ |

| ID | Type Of Document | Text |
|---|---|---|
| 1 | Notice Board Data | Liquid Crystal Monitor Manufactured By ○○ Had Very Good Image Quality. |
| 2 | Notice Board Data | Air Conditioner Manufactured By △△ Company Does Not Make Foot Warm |
| ⋮ | ⋮ | ⋮ |
| 10001 | SNS Data | I Played A New Game Manufactured By □□ Company Yesterday And It Was Very Impressive. |
| ⋮ | ⋮ | ⋮ |
| 20001 | News Article | New Cooling Goods Are Sold By ☆☆ Company |
| ⋮ | ⋮ | ⋮ |

FIG. 19

"○○ Seinoekisyomonitaha, Totemogashitsugayokatta." ~f1
("Liquid Crystal Monitor Manufactured By ○○ Had Very Good Image Quality.")

| Header | Standard Form | Part Of Speech | Detailed Part Of Speech |
|---|---|---|---|
| ○○ | ○○ | Noun | General |
| Sei | Sei | Suffix | (None) |
| No | No | Postpositional Particle | Pre-Noun Adjectival |
| Ekisyomonita | Ekisyomonita | Noun | General |
| Ha | Ha | Postpositional Particle | Binding Particle |
| , | , | Symbol | Comma |
| Totemo | Totemo | Adverb | (None) |
| Gashitsu | Gashitsu | Noun | General |
| Ga | Ga | Postpositional Particle | Nominative Particle |
| Yokat | Yoi | Adjective | Continuous Form |
| Ta | Ta | Auxiliary Verb | Past Form |
| . | . | Symbol | Period |

FIG. 20

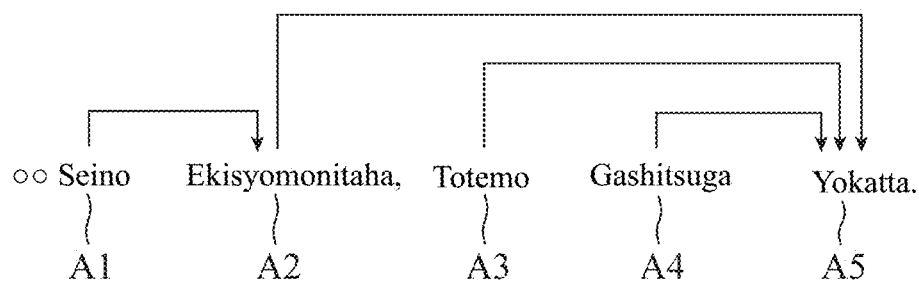

FIG. 21

Morphological Analysis Result

| Header | Standard Form | Part Of Speech | Detailed Part Of Speech |
|---|---|---|---|
| ○○ | ○○ | Noun | General |
| Sei | Sei | Suffix | (None) |
| No | No | Postpositional Particle | Pre-Noun Adjectival |
| Ekisyomonita | Ekisyomonita | Noun | General |
| Ha | Ha | Postpositional Particle | Binding Particle |
| , | , | Symbol | Comma |
| Totemo | Totemo | Adverb | (None) |
| Gashitsu | Gashitsu | Noun | General |
| Ga | Ga | Postpositional Particle | Nominative Particle |
| Yokat | Yoi | Adjective | Continuous Form |
| Ta | Ta | Auxiliary Verb | Past Form |
| . | . | Symbol | Period |

A5   B1

Conjugation Word Standardizing Result

| |
|---|
| ○○ |
| Sei |
| No |
| Ekisyomonita |
| Ha |
| , |
| Totemo |
| Gashitsu |
| Ga |
| Yoi |
| Ta |
| . |

B1

DATA ANALYZER AND DATA ANALYSIS METHOD

TECHNICAL FIELD

The present invention relates to a data analyzer and data analysis method for analyzing text data.

BACKGROUND ART

In order to analyze various pieces of text data described in natural language, it is necessary to consider word similarity, and various analysis methods have been proposed.

Examples thereof include a method using a synonym dictionary in which similar words are registered and a method for automatically calculating word similarity using similarity of notation character strings.

However, when there is a large amount of data to be analyzed, it may be impossible to sufficiently analyze word similarity only with words registered in the synonym dictionary.

In the latter method, similarity between words which are different in notation but semantically similar is not considered at all.

In order to solve such a problem, distributed representations of words based on an idea that the meaning of a word in a sentence is defined by a context have been proposed.

In the distributed representations of words, fixed-dimensional vector data (hereinafter referred to as a word embedding) is assigned to each word on the basis of a large amount of text corpus, and semantic similarity between words is expressed with a distance between their respective word embeddings. Note that the word embedding is a feature vector of an assigned word and includes a fixed-dimensional numerical element. In the distributed representations of words, as a parameter representing semantic similarity between words, a cosine distance between their respective word embeddings is calculated.

For example, Non-Patent Literature 1 describes a technique for extracting a word having a small cosine distance from any of a first quarter point vector, a half point vector, and a third quarter point vector between word embeddings assigned to respective adjective W1 and adjective W2 constituting a pair of antonyms.

A word thus extracted forms a word group having semantic continuity between adjective W1 and adjective W2 which is an antonym of adjective W1.

CITATION LIST

Patent Literatures

Non-Patent Literature 1: Joo-Kyung Kim, Marie-Catherince de Marneffe, "Deriving adjectival scales from continuous space word representations", Proceedings of the 2013 Conference on Empirical Methods in Natural Language Processing.

SUMMARY OF INVENTION

Technical Problem

Prior art described in Non-Patent Literature 1 does not consider that a pair of adjective W1 and adjective W2 which is an antonym of adjective W1 is often used in similar contexts.

For this reason, in prior art, when adjective W1 and adjective W2 are designated as a viewpoint of analysis, a word/phrase group with semantic continuity cannot be accurately acquired disadvantageously.

In this case, in an analysis result, a word/phrase group semantically close to adjective W1 and a word/phrase group semantically close to adjective W2 are mixed.

The present invention solves the above problem. An object of the present invention is to obtain a data analyzer and a data analysis method capable of enhancing discriminability between a word/phrase group semantically close to one word/phrase of a pair of antonyms used in similar contexts and a word/phrase group semantically close to the other word/phrase even when the pair is designated as a viewpoint of analysis.

Solution to Problem

A data analyzer according to the present invention includes a processor to perform a program, and a memory to store the program which, when executed by the processor, performs processes. The processes include collecting a word/phrase of an expression similar to a word/phrase input as a viewpoint of analysis and vector data corresponding to the word/phrase of the similar expression, from distributed representations of words data including a plurality of words/phrases and fixed-dimensional vector data assigned to each of the plurality of words/phrases. The processes further include selecting a dimension of vector data depending on the word/phrase input as the viewpoint of analysis, and compressing the vector data corresponding to the collected word/phrase in the selected dimension.

Advantageous Effects of Invention

According to the present invention, a dimension of vector data is selected on the basis of a word/phrase input as a viewpoint of analysis, and vector data corresponding to a word/phrase of an expression similar to the word/phrase input as the viewpoint of analysis is compressed in the selected dimension. As a result, even when a pair of antonyms used in similar contexts is designated as a viewpoint of analysis, discriminability between a word/phrase group semantically close to one word/phrase of the pair and a word/phrase group semantically close to the other word/phrase can be enhanced.

BRIEF DESCRIPTION OF DRAWINGS

FIG. 6A is a diagram illustrating an input screen (example 1) for an analysis viewpoint word/phrase. FIG. 6B is a diagram illustrating an input screen (example 2) for an analysis viewpoint word/phrase. FIG. 6C is a diagram illustrating an input screen (example 3) for an analysis viewpoint word/phrase.

FIG. 19 is a diagram illustrating an example of a morphological analysis result.

FIG. 20 is a diagram illustrating an example of a modification analysis result.

FIG. 21 is a diagram illustrating an example of a conjugation word standardizing result.

DESCRIPTION OF EMBODIMENTS

Hereinafter, in order to describe the present invention in more detail, embodiments for carrying out the present invention will be described with reference to the attached drawings.

First Embodiment

Figure 1:
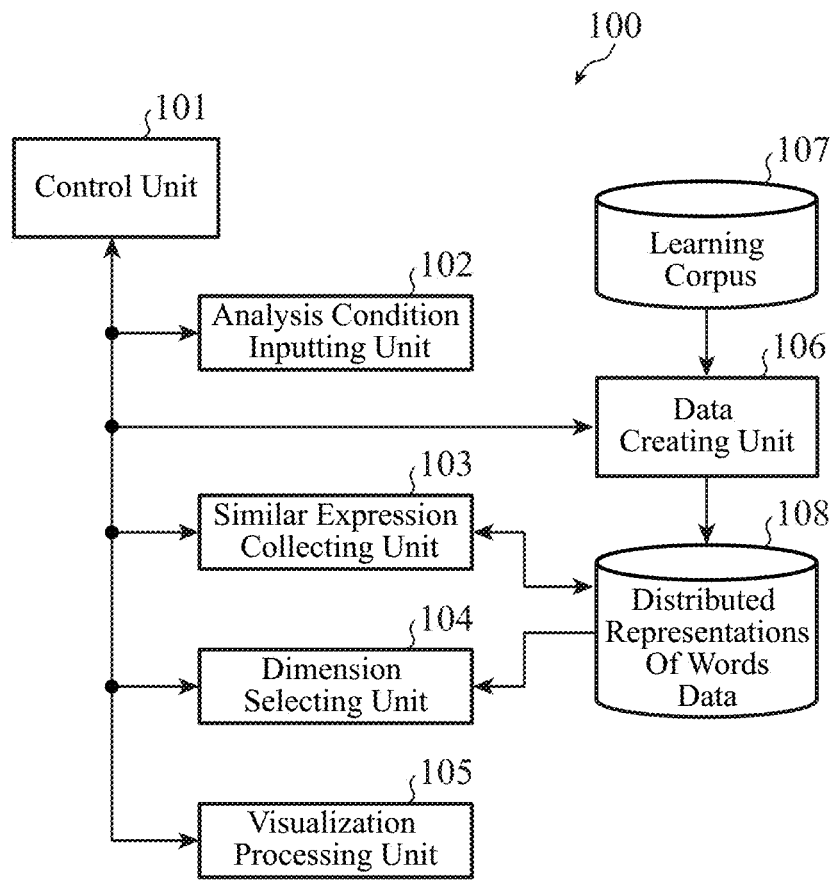
FIG. 1 is a block diagram illustrating a configuration of a data analyzer according to a first embodiment of the present invention.

FIG. 1 is a block diagram illustrating a configuration of a data analyzer 100 according to a first embodiment of the present invention. The data analyzer 100 is provided in an information processing device such as a smartphone, a tablet PC, or a desktop PC, and analyzes text data. In a system including a server device and a client PC, the data analyzer 100 may be provided in the server device, and the client PC may access the server device to obtain a data analysis result.

As illustrated in FIG. 1, the data analyzer 100 includes a control unit 101, an analysis condition inputting unit 102, a similar expression collecting unit 103, a dimension selecting unit 104, a visualization processing unit 105, and a data creating unit 106. The data creating unit 106 is connected to a storage unit 107 for storing a learning corpus and a storage unit 108 for storing distributed representations of words data.

The control unit 101 controls a process of each of the analysis condition inputting unit 102, the similar expression collecting unit 103, the dimension selecting unit 104, the visualization processing unit 105, and the data creating unit 106.

For example, the above-described components execute respective processes in a procedure in accordance with control from the control unit 101. Note that each of the above-described components may have a function of the control unit 101. In this case, the control unit 101 is excluded from the configuration of the data analyzer 100.

The analysis condition inputting unit 102 is a component for receiving an input of a word/phrase which is a viewpoint of analysis (hereinafter referred to as an analysis viewpoint word/phrase). For example, the analysis condition inputting unit 102 causes a display device to display an input screen for an analysis viewpoint word/phrase, and receives an input of the analysis viewpoint word/phrase using an input device. Information including the analysis viewpoint word/phrase received by the analysis condition inputting unit 102 is output to the similar expression collecting unit 103 and the dimension selecting unit 104.

The analysis condition inputting unit 102 may be included, for example, in an input device provided separately from the data analyzer 100. In this case, the analysis viewpoint word/phrase is output from the input device to the data analyzer 100, and the analysis condition inputting unit 102 is excluded from the configuration of the data analyzer 100.

The similar expression collecting unit 103 collects a word/phrase of an expression similar to an analysis viewpoint word/phrase and vector data corresponding to the word/phrase from the distributed representations of words data. The distributed representations of words data includes a plurality of words/phrases and vector data which is fixed-dimensional numerical data assigned to each of the plurality of words and phrases.

Hereinafter, the vector data assigned to a word is referred to as a "word embedding".

Note that a word/phrase also includes a phrase including a plurality of words in addition to a word. However, in the following description, a phrase is treated as a kind of word for convenience, and vector data corresponding to a phrase is also referred to as a "word embedding".

The dimension selecting unit 104 selects a dimension of a word embedding in distributed representations of words data depending on an analysis viewpoint word/phrase, and compresses a word embedding corresponding to a word/phrase collected by the similar expression collecting unit 103 in the selected dimension. For example, the dimension selecting unit 104 selects a dimension depending on an analysis viewpoint word/phrase from dimensions of a word embedding in distributed representations of words data obtained by prior learning, and compresses a word embedding corresponding to a word/phrase of an expression similar to the analysis viewpoint word/phrase in the selected dimension. As a result, even when a pair of antonyms is used in similar contexts, discriminability between a word/phrase group semantically close to one word/phrase of the pair and a word/phrase group semantically close to the other word/phrase can be enhanced.

The visualization processing unit 105 visualizes an analysis result of distributed representations of words data on the basis of a word embedding dimensionally compressed by the dimension selecting unit 104.

For example, the visualization processing unit 105 creates positioning screen information of an analysis target word/phrase from positioning coordinates corresponding to a word embedding of an analysis target word/phrase.

Note that the visualization processing unit 105 may be included, for example, in a display device provided separately from the data analyzer 100. In this case, the display device creates display information of an analysis result input from the data analyzer 100, and therefore the visualization processing unit 105 is excluded from the configuration of the data analyzer 100.

The data creating unit 106 creates distributed representations of words data on the basis of a learning corpus read out from the storage unit 107. For example, the data creating unit 106 standardizes a conjugation word on the basis of a morphological analysis result and a modification analysis result of text data included in the learning corpus. Then, the data creating unit 106 integrates negative expressions in a clause, integrates an adverb with an adjective or an adjective verb to be modified by the adverb, and creates distributed representations of words data for an integrated word/phrase.

Note that the data creating unit 106 may be included, for example, in an external device provided separately from the data analyzer 100. In this case, the external device creates distributed representations of words data, and therefore the data creating unit 106 is excluded from the configuration of the data analyzer 100.

The storage unit 107 stores a learning corpus. The storage unit 108 stores distributed representations of words data. The storage units 107 and 108 may be provided in the data analyzer 100, or may be provided in an external storage device provided separately from the data analyzer 100. For example, the data creating unit 106 may exchange data with the storage units 107 and 108 by communicating with the external storage device via a communication line such as the Internet or an intranet.

Figure 2:
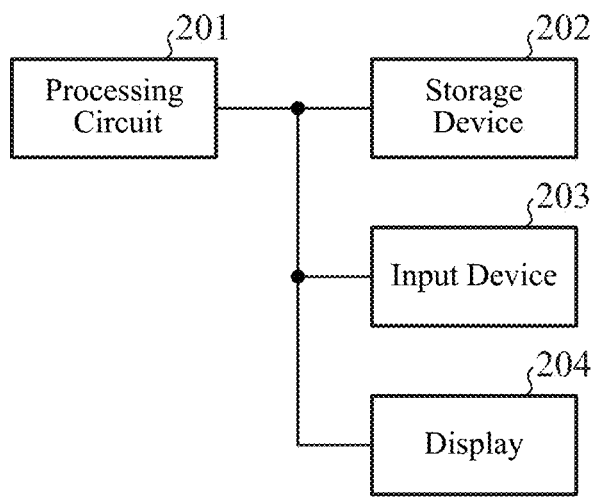
FIG. 2 is a block diagram illustrating a hardware configuration for implementing a function of the data analyzer according to the first embodiment.

FIG. 2 is a block diagram illustrating a hardware configuration for implementing a function of the data analyzer 100. A processing circuit 201, a storage device 202, an input device 203, and a display 204 are connected to one another by bus.

Figure 3:
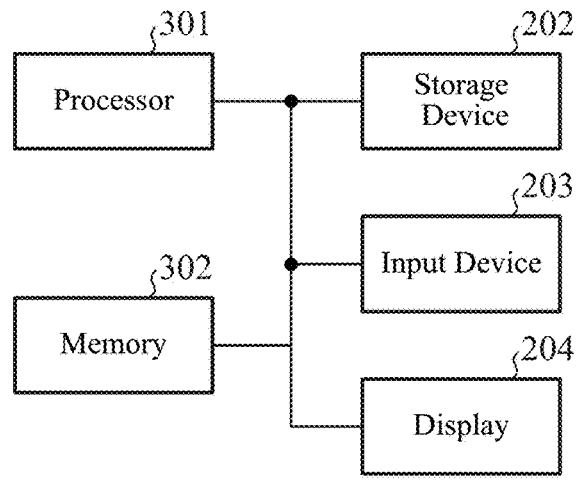
FIG. 3 is a block diagram illustrating a hardware configuration in which software for implementing the function of the data analyzer according to the first embodiment is executed.

FIG. 3 is a block diagram illustrating a hardware configuration in which software for implementing the function of the data analyzer 100 is executed. The storage device 202, the input device 203, the display 204, a processor 301, and a memory 302 are connected to one another by bus.

In FIGS. 2 and 3, the storage device 202 is a storage device for implementing the storage units 107 and 108, and stores a learning corpus and distributed representations of words data.

The storage device 202 may store an analysis condition such as an analysis viewpoint word/phrase received by the analysis condition inputting unit 102 or a visualization processing result by the visualization processing unit 105.

The storage device 202 is implemented by, for example, a random access memory (RAM), a read only memory (ROM), a flash memory, or a hard disk drive (HDD), and may be a storage device obtained by combining these. A part or all of a storage area of the storage device 202 may be provided in an external storage device.

In this case, the data analyzer 100 communicates with the external storage device via a communication line such as the Internet or an intranet, and data is thereby exchanged.

The input device 203 is a device for inputting an analysis condition, and is an apparatus such as a keyboard, a mouse, or a touch panel. The analysis condition inputting unit 102 receives an analysis condition input using the input device 203. Note that the input device 203 may be any device as long as being able to input an analysis condition to the data analyzer 100, and is not limited to a keyboard, a mouse, and a touch panel.

The display 204 is a display device for displaying an input screen for an analysis condition, a positioning screen for an analysis result, and the like, and may be, for example, a display unit of an information processing device in which the data analyzer 100 is provided. Note that the display 204 may have any display method or shape such as a liquid crystal monitor or a projector as long as being a display device capable of displaying each piece of information generated by a process of the data analyzer 100.

Each of functions of the control unit 101, the analysis condition inputting unit 102, the similar expression collecting unit 103, the dimension selecting unit 104, the visualization processing unit 105, and the data creating unit 106 in the data analyzer 100 is implemented by a processing circuit. That is, the data analyzer 100 includes a processing circuit for executing these functions. The processing circuit may be dedicated hardware or a CPU for executing a program stored in a memory.

In a case where the processing circuit is the processing circuit 201 of dedicated hardware illustrated in FIG. 2, for example, a single circuit, a composite circuit, a programmed processor, a parallel programmed processor, an application specific integrated circuit (ASIC), a field-programmable gate array (FPGA), or a combination thereof corresponds to the processing circuit 201. Each of functions of the control unit 101, the analysis condition inputting unit 102, the similar expression collecting unit 103, the dimension selecting unit 104, the visualization processing unit 105, and the data creating unit 106 in the data analyzer 100 may be implemented by a processing circuit, or the functions may be collectively implemented by one processing circuit.

In a case where the processing circuit is the processor 301 illustrated in FIG. 3, each of functions of the control unit 101, the analysis condition inputting unit 102, the similar expression collecting unit 103, the dimension selecting unit 104, the visualization processing unit 105, and the data creating unit 106 is implemented by software, firmware, or a combination of software and firmware. The software and the firmware are each described as a program and stored in the memory 302.

The processor 301 implements the functions by reading out and executing a program stored in the memory 302. That is, the data analyzer 100 includes the memory 302 for storing a program that causes processes in steps ST401 to ST404 illustrated in FIG. 4 described later to be executed as a result when the program is executed by the processor 301. These programs cause a computer to execute procedures or methods of the control unit 101, the analysis condition inputting unit 102, the similar expression collecting unit 103, the dimension selecting unit 104, the visualization processing unit 105, and the data creating unit 106.

Here, to the memory, for example, a nonvolatile or volatile semiconductor memory such as RAM, ROM, a flash memory, erasable programmable ROM (EPROM), or electrically EPROM (EEPROM), a magnetic disk, a flexible disk, an optical disc, a compact disc, a mini disc, a digital versatile disk (DVD), or the like corresponds.

Some of functions of the control unit 101, the analysis condition inputting unit 102, the similar expression collecting unit 103, the dimension selecting unit 104, the visualization processing unit 105, and the data creating unit 106 may be implemented by dedicated hardware, and some of the functions may be implemented by software or firmware.

For example, the control unit 101 implements a function thereof with a processing circuit of dedicated hardware. Functions of the analysis condition inputting unit 102, the similar expression collecting unit 103, the dimension selecting unit 104, the visualization processing unit 105, and the data creating unit 106 are implemented by execution of a program stored in the memory 302 by the processor 301.

In this way, the processing circuit can implement the above-described functions by hardware, software, firmware, or a combination thereof.

Next, an operation will be described.

Figure 4:
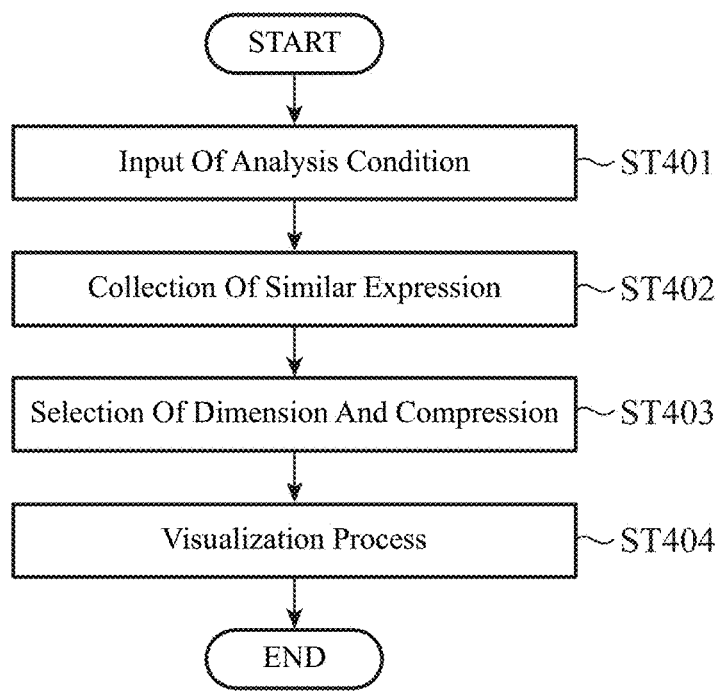
FIG. 4 is a flowchart illustrating an operation of the data analyzer according to the first embodiment.

FIG. 4 is a flow chart illustrating an operation of the data analyzer 100, and indicates a series of processes from an input of an analysis condition to visualization of an analysis result.

The analysis condition inputting unit 102 receives an input of an analysis condition including an analysis viewpoint word/phrase (step ST401). For example, the analysis condition inputting unit 102 outputs input screen information for inputting an analysis condition to the display 204, and the display 204 thereby displays an input screen. An analysis worker inputs an analysis condition using the input device 203 on the basis of the input screen. The analysis condition inputting unit 102 outputs information input using the input device 203 to the similar expression collecting unit 103 and the dimension selecting unit 104.

The similar expression collecting unit 103 searches for distributed representations of words data stored in the storage unit 108 on the basis of an analysis viewpoint word/phrase included in an analysis condition, and collects a word/phrase of an expression similar to the analysis viewpoint word/phrase and vector data corresponding to the word/phrase (step ST402).

For example, the similar expression collecting unit 103 acquires and synthesizes word embeddings corresponding to respective analysis viewpoint words/phrases from the distributed representations of words data, and collects a word embedding in which a cosine distance from the synthetic vector is smaller than a threshold and a word/phrase corresponding to the word embedding.

The dimension selecting unit 104 selects a dimension of a word embedding in distributed representations of words data depending on an analysis viewpoint word/phrase included in an analysis condition, and compresses a word embedding corresponding to a word/phrase collected by the similar expression collecting unit 103 in the selected dimension (step ST403).

For example, the dimension selecting unit 104 creates a new word embedding emphasizing an element of the i-th dimension in a word embedding corresponding to an analysis viewpoint word/phrase, and accumulates a cosine distance between the new word embeddings created for a respective plurality of the analysis viewpoint words/phrases as a selection score in the i-th dimension.

The dimension selecting unit 104 selects a dimension in which an accumulated selection score is equal to or larger than a threshold as a dimension to be focused on. Next, the dimension selecting unit 104 compresses a word embedding corresponding to a word/phrase collected by the similar expression collecting unit 103 in the selected dimension.

The visualization processing unit 105 visualizes an analysis result of distributed representations of words data on the basis of the word embedding dimensionally compressed by the dimension selecting unit 104 (step ST404).

For example, the visualization processing unit 105 calculates positioning coordinates corresponding to each of word embeddings of respective analysis target words/phrases on the basis of a cosine distance between the dimensionally compressed word embeddings, and creates positioning screen information of an analysis target word/phrase corresponding to the calculated positioning coordinates. The positioning screen information is displayed by a display device.

Next, details of an analysis condition input process in step ST401 will be described.

Figure 5:
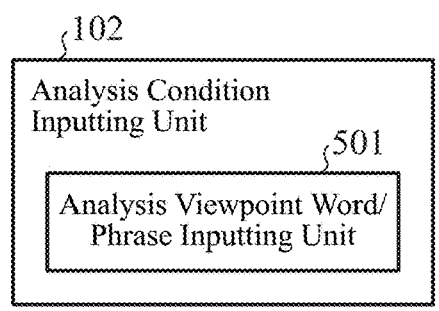
FIG. 5 is a block diagram illustrating a configuration of an analysis condition inputting unit.

FIG. 5 is a block diagram illustrating a configuration of the analysis condition inputting unit 102. The analysis condition inputting unit 102 includes an analysis viewpoint word/phrase inputting unit 501 as illustrated in FIG. 5. The analysis viewpoint word/phrase inputting unit 501 receives an input of an analysis viewpoint word/phrase.

For example, the analysis viewpoint word/phrase inputting unit 501 outputs input screen information for inputting an analysis viewpoint word/phrase to the display 204, and the display 204 displays an input screen based on the input screen information. On the basis of this input screen, an analysis worker can input an analysis viewpoint word/phrase depending on a purpose of analysis in the data analyzer 100 using the input device 203.

FIG. 6A is a diagram illustrating an input screen (example 1) for an analysis viewpoint word/phrase. The input screen illustrated in FIG. 6A includes a plurality of input columns, and an analysis viewpoint word/phrase can be input in each of the input columns. In the example of FIG. 6A, word a1 is input in an input column of analysis viewpoint word/phrase 1, and word a2 which is an antonym of word a1 is input in an input column of analysis viewpoint word/phrase 2.

FIG. 6B is a diagram illustrating an input screen (example 2) for an analysis viewpoint word/phrase. An input screen illustrated in FIG. 6B includes, in addition to an input column for each analysis viewpoint word/phrase, an input column for the number of corresponding target words and an input column for corresponding target word similarity, the number of target words and the target word similarity being used in a similar expression collecting process.

The number of target words is a threshold for the number of words/phrases each collected as a word/phrase of an expression similar to an analysis viewpoint word/phrase. The target word similarity is a threshold for a cosine distance between a word embedding corresponding to the analysis viewpoint word/phrase and a word embedding corresponding to a word/phrase collected as a word/phrase of the similar expression. These are data for defining a scope of analysis.

In the example of FIG. 6B, words b1 to b4 are input in input columns of analysis viewpoint words/phrases 1 to 4, respectively.

Since "100" is input in an input column for the number of target words corresponding to analysis viewpoint word/phrase 2, 100 or less words/phrases each having an expression similar to word b2 which is analysis viewpoint word/phrase 2 are collected.

Since "0.8" is input in an input column for target word similarity corresponding to analysis viewpoint word/phrase 3, for word b3 which is analysis viewpoint word/phrase 3, a word/phrase corresponding to a word embedding having a cosine distance equal to or less than 0.8 is collected as a word/phrase of an expression similar to word b3.

Furthermore, "100" is input in an input column for the number of target words corresponding to analysis viewpoint word/phrase 4 and "0.7" is input in an input column for target word similarity corresponding to analysis viewpoint word/phrase 4, and thus for word b4 which is analysis viewpoint word/phrase 4, 100 or less words/phrases each having a cosine distance equal to or less than 0.7 are collected.

Incidentally, when a numerical value is not input in an input column for the number of target words or an input column for target word similarity, a pre-defined default value is used.

When numerical values are input in both an input column for the number of target words and an input column for target word similarity, either one may be used with priority.

FIG. 6C is a diagram illustrating an input screen (example 3) for an analysis viewpoint word/phrase. The input screen illustrated in FIG. 6C includes input columns in which a respective plurality of words/phrases having the same viewpoint of analysis is input.

In the example of FIG. 6C, analysis viewpoint word/phrase groups each include three input columns, and word a1, and word c1 and word d1 related to word a1 are input in analysis viewpoint word/phrase group 1. Similarly, word a2, and word c2 and word d2 related to word a2 are input in analysis viewpoint word/phrase group 2.

An analysis worker can input an analysis condition on the basis of any of the input screens as described above.

The analysis condition inputting unit 102 outputs information indicating an analysis condition input by an analysis worker to the similar expression collecting unit 103 and the dimension selecting unit 104.

Next, details of the similar expression collecting process in step ST402 will be described.

Figures 7, 8:
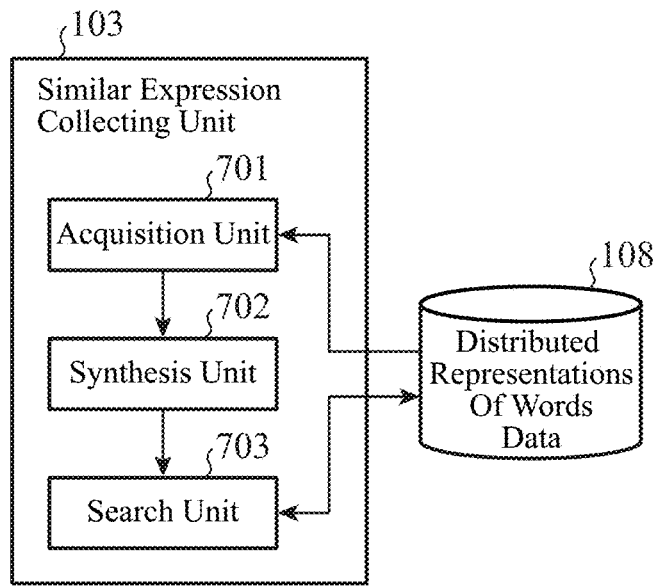
FIG. 7 is a block diagram illustrating a configuration of a similar expression collecting unit.
FIG. 8 is a diagram illustrating an example of distributed representations of words data.

FIG. 7 is a block diagram illustrating a configuration of the similar expression collecting unit 103. The similar expression collecting unit 103 includes an acquisition unit 701, a synthesis unit 702, and a search unit 703 as illustrated in FIG. 7.

The acquisition unit 701 acquires a word embedding corresponding to an analysis viewpoint word/phrase from distributed representations of words data stored in the storage unit 108. The synthesis unit 702 creates a synthetic vector of a word embedding group acquired by the acquisition unit 701. The search unit 703 searches for distributed representations of words data of an expression similar to an analysis viewpoint word/phrase from pieces of distributed representations of words data stored in the storage unit 108 using the synthetic vector as a search key.

FIG. 8 is a diagram illustrating an example of distributed representations of words data stored in the storage unit 108. As illustrated in FIG. 8, the distributed representations of words data includes information set in each of an ID column 801, a header column 802, and a word embedding column 803. The distributed representations of words data is created in advance by the data creating unit 106 on the basis of a learning corpus.

In the ID column 801, an ID uniquely assigned to each word/phrase in the distributed representations of words data is set, and for example, an identification number i (serial number assigned to each word/phrase) may be used as the ID. In the header column 802, a word/phrase is set. In FIG. 8, word/phrase T[i] is set in the header column 802 of ID=i. In the word embedding column 803, a word embedding of the dimension number N assigned to a word/phrase in the header column 802 is set. For example, a word embedding corresponding to word/phrase T[i] of ID=i is W[i]=(v[i,1], v[i,2], . . . , v[i,N]).

Figures 9, 10:
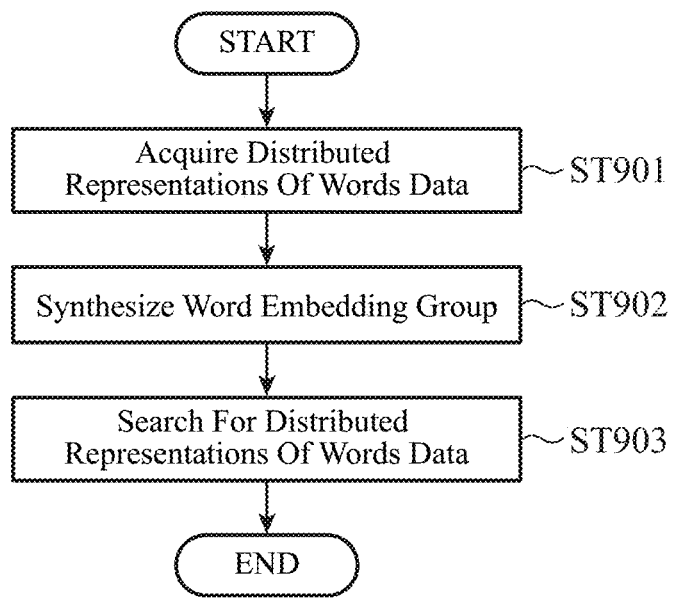
FIG. 9 is a flowchart illustrating an operation of the similar expression collecting unit.
FIG. 10 is a diagram illustrating an example of a similar expression collecting result.

FIG. 9 is a flowchart illustrating an operation of the similar expression collecting unit 103, and illustrates details of a process in step ST402 in FIG. 4.

First, the acquisition unit 701 acquires a word embedding corresponding to an analysis viewpoint word/phrase from distributed representations of words data stored in the storage unit 108 (step ST901).

For example, the acquisition unit 701 acquires a word embedding corresponding to an analysis viewpoint word/phrase by searching for a word/phrase in the header column 802 in the distributed representations of words data on the basis of the analysis viewpoint word/phrase input in step ST401. When word a1 and word a2 are input as analysis viewpoint words/phrases on the basis of the input screen illustrated in FIG. 6A, word embeddings W[1] and W[2] corresponding to these words are acquired.

Next, the synthesis unit 702 synthesizes a word embedding group acquired by the acquisition unit 701 (step ST902). For example, the synthesis unit 702 divides word embeddings in the word embedding group by their respective norms to normalize their respective lengths, further divides the sum of these word embeddings by its norm to obtain a normalized vector, and outputs the normalized vector as a synthetic vector.

Steps ST901 and ST902 are repeatedly executed as many as the number of analysis viewpoint words/phrases input as an analysis condition, and a synthetic vector for each of the analysis viewpoint words/phrases is calculated.

The search unit 703 searches for distributed representations of words data of an expression similar to an analysis viewpoint word/phrase from pieces of distributed representations of words data stored in the storage unit 108 using the corresponding synthetic vector obtained in step ST902 as a search key (step ST903).

For example, the search unit 703 acquires, from the storage unit 108, word embeddings in each of which a cosine distance from the synthetic vector is equal to or less than a threshold, and also acquires and lists words/phrases in the header column 802 corresponding to the respective word embeddings. A list of the words/phrases thus acquired and the word embeddings corresponding to the words/phrases is a similar expression collecting result.

When a threshold for the number of words is set as the number of target words and a threshold for a cosine distance is set as target word similarity, the search unit 703 collects words/phrases of which the number is equal to or less than the number of target words, each of the words/phrases being corresponding to a word embedding of which a cosine distance from the synthetic vector is equal to or less than the threshold for a cosine distance.

FIG. 10 is a diagram illustrating an example of the similar expression collecting result. As illustrated in FIG. 10, distributed representations of words data of an expression similar to an analysis viewpoint word/phrase includes a header, a word embedding, and similarity (cosine distance from the synthetic vector).

Next, details of dimension selection and a compression process in step ST403 will be described.

Figure 11:
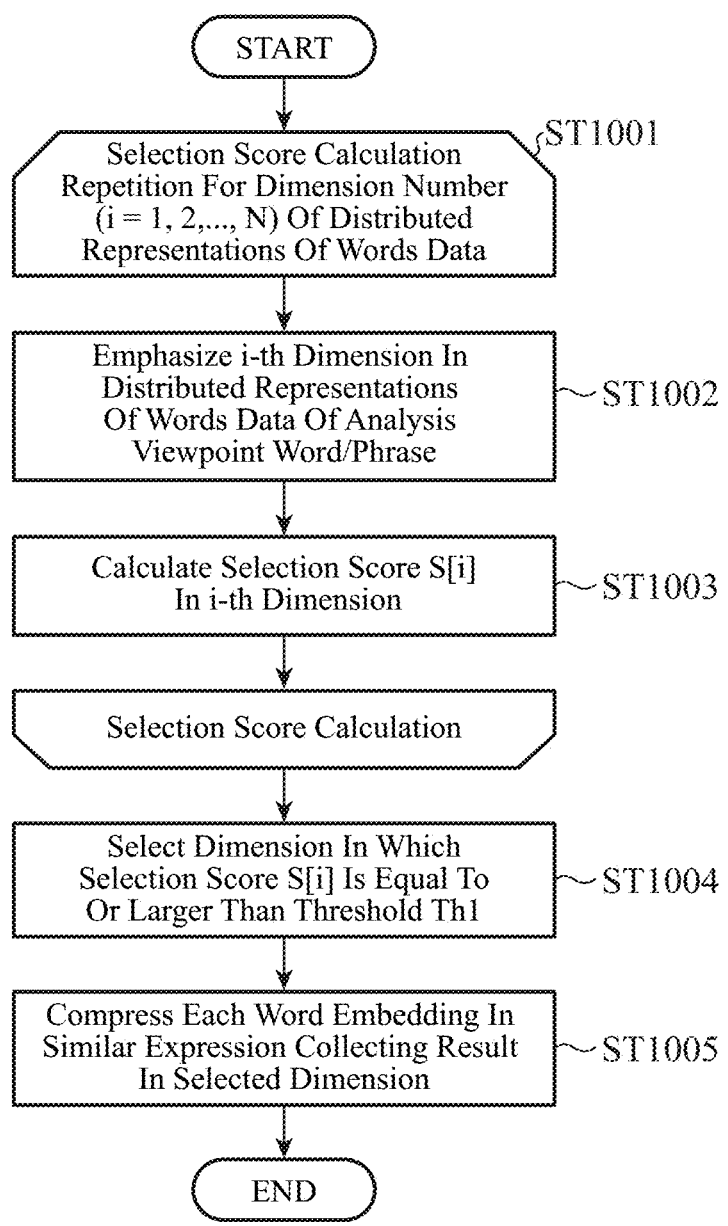
FIG. 11 is a flowchart illustrating an operation of a dimension selecting unit.
Figure 12:
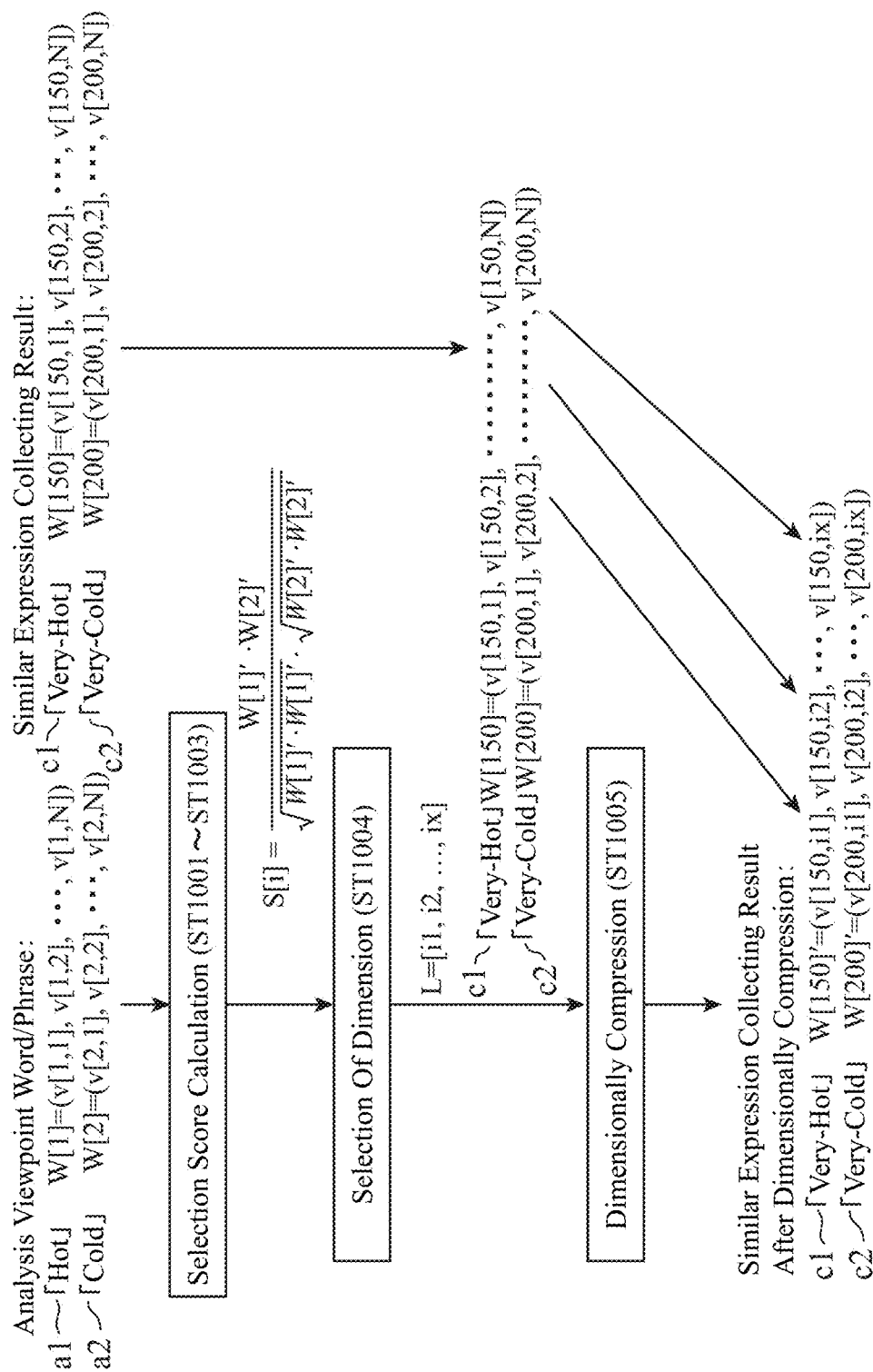
FIG. 12 is a diagram illustrating an outline of processes from step ST1001 to step ST1005 in FIG. 11.

FIG. 11 is a flowchart illustrating an operation of the dimension selecting unit 104, and illustrates a series of processes until a word embedding is compressed in a dimension selected from distributed representations of words data. FIG. 12 is a diagram illustrating an outline of processes from step ST1001 to step ST1005 in FIG. 11.

First, the dimension selecting unit 104 sets the number of repeated processes in steps ST1002 and ST1003 (step ST1001).

For example, the dimension selecting unit 104 repeatedly executes processes in steps ST1002 and ST1003 for a dimension number (i=1, 2, . . . , N) of distributed representations of words data illustrated in FIG. 8.

In step ST1002, the dimension selecting unit 104 emphasizes the i-th dimension of distributed representations of words data corresponding to an analysis viewpoint word/phrase input in step ST401. For example, the dimension selecting unit 104 creates a new word embedding in which an element in the i-th dimension of a word embedding corresponding to an analysis viewpoint word/phrase is emphasized by multiplying the element in the i-th dimension by a predetermined number.

In a case of i=2, from word embedding W[1]=(v[1,1], v[1,2], . . . , v[1,N]) corresponding to word a1 which is an analysis viewpoint word/phrase, a new word embedding W[1]'=(v[1,1], v[1,2]×100, . . . , v[1,N]) is created. Similarly, from word embedding W[2]=(v[2,1], v[2,2], . . . , v[2,N]) corresponding to word a2 which is an analysis viewpoint word/phrase, a new word embedding W[2]'=(v[2,1], v[2,2]×100, . . . , v[2,N]) is created. Here, the element in the i-th dimension is multiplied by 100.

In step ST1003, the dimension selecting unit 104 calculates selection score S[i] in the i-th dimension. For example, the dimension selecting unit 104 calculates a cosine distance between W[1]' and W[2]' created in step ST1002 in accordance with the following formula (1), and stores the calculated cosine distance as an element of S[i].

$$S[i] = \frac{W[1]' \cdot W[2]'}{\sqrt{W[1]' \cdot W[1]'} \cdot \sqrt{W[2]' \cdot W[2]'}} \quad (1)$$

Note that when three or more analysis viewpoint words/phrases are input, the dimension selecting unit 104 calculates a cosine distance between word embeddings in each of which the i-th dimension is emphasized, the cosine distance being corresponding to each pair of the analysis viewpoint words/phrases, in accordance with the following formula (2). Then, the dimension selecting unit 104 stores, as an element of S[i], a value obtained by summing the cosine distance calculated for each pair of the analysis viewpoint words/phrases.

Note that, in the following formula (2), j and k represent ID numbers different from each other.

$$S[i] = \sum_{j,k} \frac{W[j]' \cdot W[k]'}{\sqrt{W[j]' \cdot W[j]'} \cdot \sqrt{W[k]' \cdot W[k]'}} \quad (2)$$

The dimension selecting unit 104 repeats processes in steps ST1002 and ST1003 and calculates a selection score in each dimension. The processes up to this point correspond to a selection score calculating process illustrated in FIG. 12.

In step ST1004, the dimension selecting unit 104 selects a dimension corresponding to a selection score equal to or larger than threshold Th1 among selection scores in respective dimensions calculated in the selection score calculating process, and lists the number i of the selected dimension to obtain a list L=[i1, i2, . . . , ix].

The processes up to this point correspond to a dimension selecting process illustrated in FIG. 12.

Next, on the basis of the list L=[i1, i2, . . . , ix] of the dimension numbers obtained in step ST1004, the dimension selecting unit 104 compresses a word embedding corresponding to a word/phrase collected in step ST402 in the selected dimension (step ST1005).

A case where a word embedding W[150]=(v[150,1], v[150,2], . . . , v[150,N]) corresponding to word/phrase c1 and a word embedding W[200]=(v[200,1], v[200,2], . . . , v[200,N]) corresponding to word/phrase c2 are similar expression collecting results will be exemplified.

A dimension compressing process replaces the dimension numbers of the word embeddings with the dimension numbers in the list L. Since elements in the list L are [i1, i2, . . . , ix], the word embedding corresponding to word/phrase c1 is compressed to W[150]'=(v[150,i1], v[150,i2], . . . , v[150,ix]) as illustrated in FIG. 12.

Similarly, the word embedding corresponding to word/phrase c2 is compressed to W[200]'=(v[200,i1], v[200,i2], . . . , v[200,ix]).

Next, details of a visualization process in step ST404 will be described.

Figure 13:
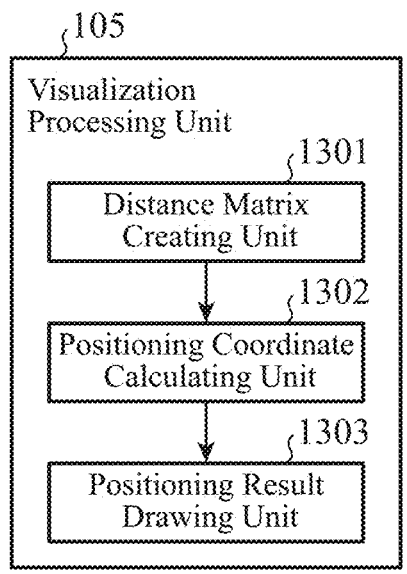
FIG. 13 is a block diagram illustrating a configuration of a visualization processing unit.

FIG. 13 is a block diagram illustrating a configuration of the visualization processing unit 105. As illustrated in FIG. 13, the visualization processing unit 105 includes a distance matrix creating unit 1301, a positioning coordinate calculating unit 1302, and a positioning result drawing unit 1303.

The distance matrix creating unit 1301 creates a distance matrix D using a word embedding dimensionally compression by the dimension selecting unit 104.

The positioning coordinate calculating unit 1302 calculates, on the basis of the distance matrix D, positioning coordinates for a word embedding corresponding to each of an analysis viewpoint word/phrase and a similar expression collecting result.

The positioning result drawing unit 1303 draws a positioning result on the basis of positioning coordinates calculated by the positioning coordinate calculating unit 1302.

Figure 14:
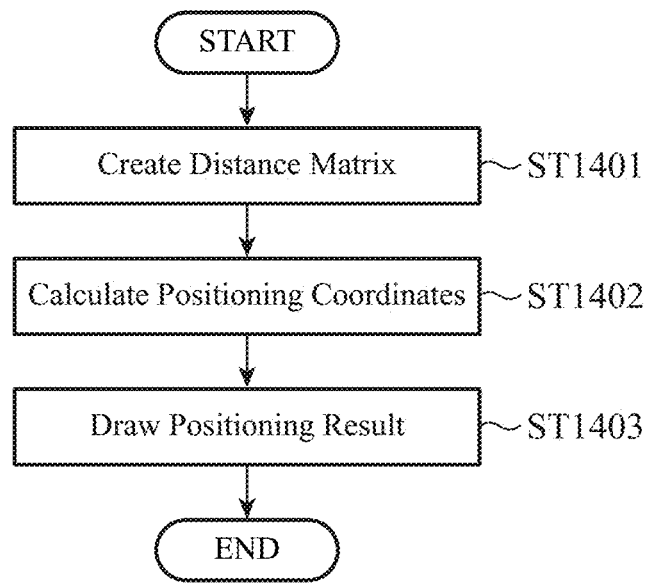
FIG. 14 is a flowchart illustrating an operation of the visualization processing unit.

FIG. 14 is a flowchart illustrating an operation of the visualization processing unit 105.

First, the distance matrix creating unit 1301 calculates cosine distance D[i,j] between word embeddings W[i]' and W[j]' dimensionally compressed in step ST403 according to the following formula (3), and creates a distance matrix D including the cosine distance D[i,j] as elements (step ST1401).

Note that, in the following formula (3), i and j represent ID numbers different from each other.

$$D[i, j] = \frac{W[i]' \cdot W[j]'}{\sqrt{W[i]' \cdot W[i]'} \cdot \sqrt{W[j]' \cdot W[j]'}} \quad (3)$$

Next, the positioning coordinate calculating unit 1302 calculates positioning coordinates P[i]=(Xi,Yi) for a word embedding W[i] on the basis of the distance matrix D (step ST1402).

For example, the positioning coordinate calculating unit 1302 can calculate positioning coordinates using a method described in Reference Literature 1 below.

(Reference Literature 1) Takayuki Saito and Sadaaki Ogawa, "Problems in applications of multidimensional scaling—from the standpoint of data analysis", Behavior Metrology, Vol. 4, No. 2 (1977).

The positioning result drawing unit 1303 draws a positioning result on the basis of positioning coordinates P[i] calculated in step ST1402 (step ST1403).

For example, when the positioning result drawing unit 1303 creates drawing information of a positioning result, the positioning result drawing unit 1303 outputs the drawing information to the display 204. The display 204 displays the drawing information input from the positioning result drawing unit 1303.

Figure 15:
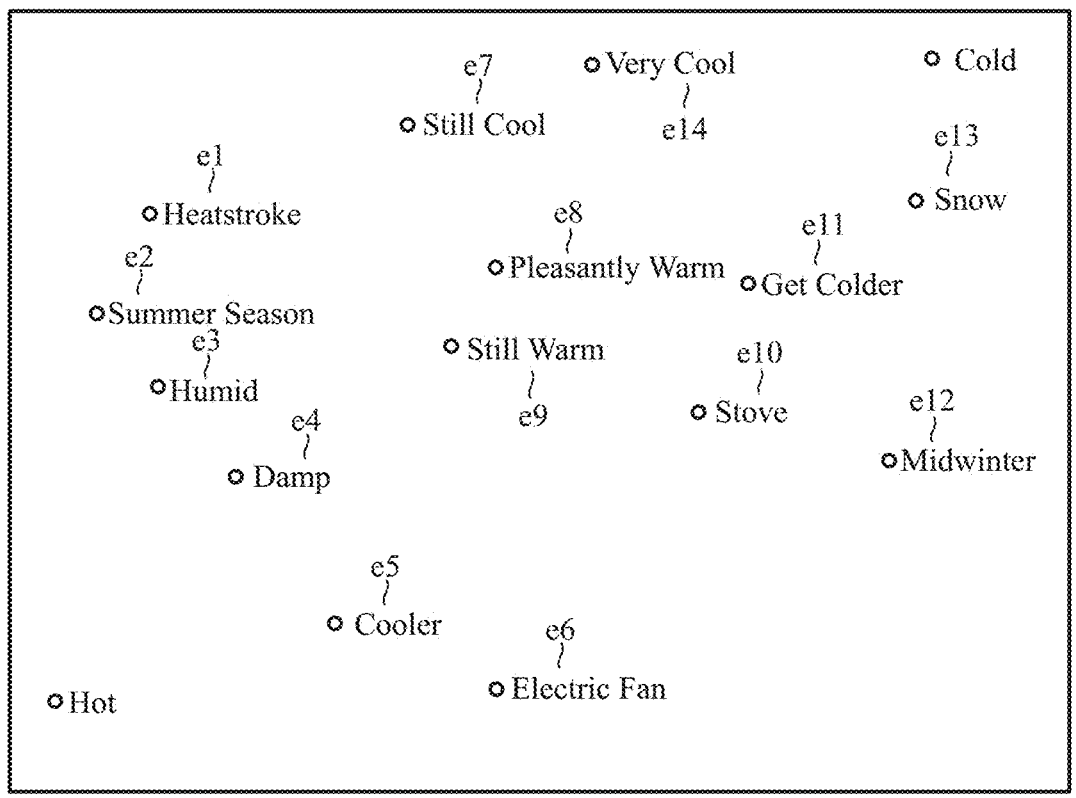
FIG. 15 is a diagram illustrating an example of a visualization processing result.

FIG. 15 is a diagram illustrating an example of a visualization processing result. For example, a pair of "hot" and "cold" which is an antonym of the "hot" is often used in relatively similar contexts.

In prior art, when such a pair of antonyms is designated as a viewpoint of analysis, it is impossible to accurately acquire a word/phrase group having semantic continuity. In this case, in an analysis result, a word/phrase group semantically close to "hot" and a word/phrase group semantically close to "cold" are mixed.

Meanwhile, as described above, the data analyzer 100 selects a dimension of a word embedding depending on an analysis viewpoint word/phrase, and compresses a word embedding corresponding to an analysis target word/phrase in the selected dimension. As a result, discriminability between a word/phrase group semantically close to one word/phrase of the pair of antonyms and a word/phrase group semantically close to the other word/phrase can be enhanced.

In FIG. 15, "hot" and "cold" constituting a pair of antonyms are disposed farthest away from each other, and a word/phrase group including words/phrases e1 to e6 semantically related to "hot" and a word/phrase group including words/phrases e7 to e14 semantically related to "cold" are disposed far away from each other to be appropriately discriminated.

Next, details of a process of creating distributed representations of words data will be described.

Figure 16:
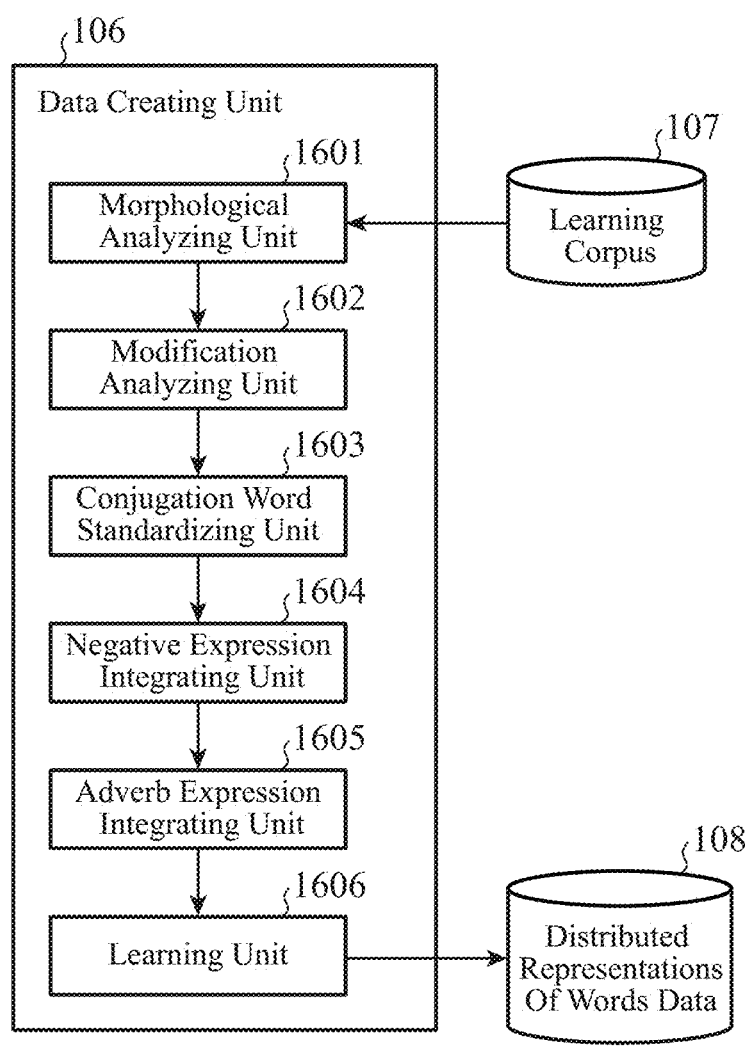
FIG. 16 is a block diagram illustrating a configuration of a data creating unit.

FIG. 16 is a block diagram illustrating a configuration of the data creating unit 106. As illustrated in FIG. 16, the data creating unit 106 includes a morphological analyzing unit 1601, a modification analyzing unit 1602, a conjugation word standardizing unit 1603, a negative expression integrating unit 1604, an adverb expression integrating unit 1605, and a learning unit 1606.

The morphological analyzing unit 1601 reads out a learning corpus stored in the storage unit 107, and performs morphological analysis on text data included in the learning corpus. The modification analyzing unit 1602 performs modification analysis on a morphological analysis result from the morphological analyzing unit 1601. The conjugation word standardizing unit 1603 extracts a standard form of a conjugation word from the morphological analysis result.

The negative expression integrating unit 1604 integrates negative expressions on the basis of the morphological analysis result, the modification analysis result, and the conjugation word standardizing result. The adverb expression integrating unit 1605 integrates adverb expressions on the basis of the morphological analysis result, the modification analysis result, and the conjugation word standardizing result.

The learning unit 1606 learns distributed representations of words data on the basis of the morphological analysis result, the modification analysis result, the conjugation word standardizing result, the negative expression integrating result, and the adverb expression integrating result. The distributed representations of words data learned by the learning unit 1606 is stored in the storage unit 108.

Figures 17, 18:
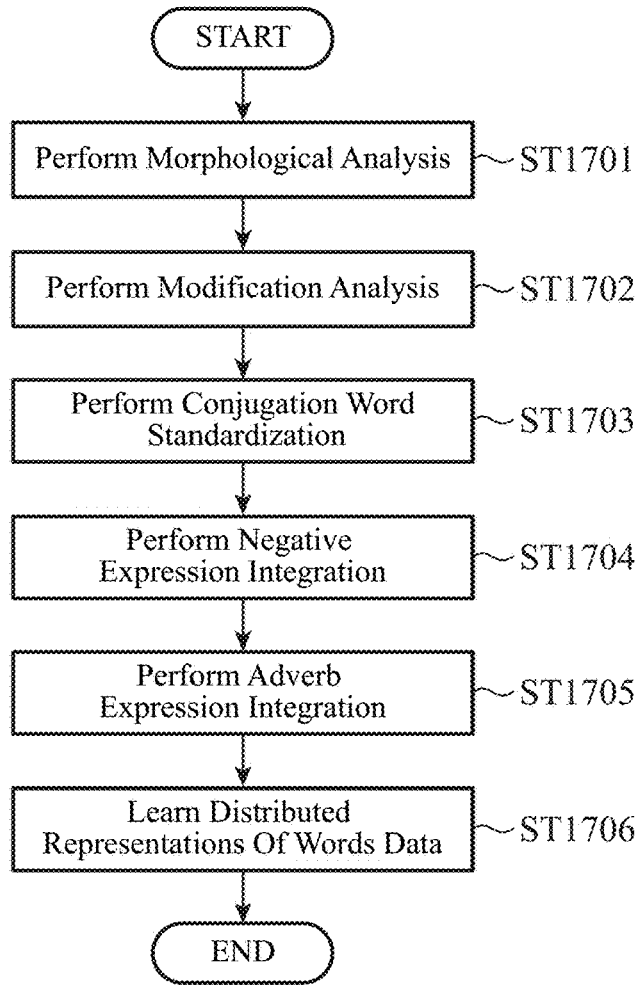
FIG. 17 is a flowchart illustrating an operation of the data creating unit.
FIG. 18 is a diagram illustrating an example of a learning corpus.

FIG. 17 is a flowchart illustrating an operation of the data creating unit 106.

First, the morphological analyzing unit 1601 performs morphological analysis on text data included in the learning corpus stored in the storage unit 107 (step ST1701).

For example, the morphological analyzing unit 1601 can perform morphological analysis by a method described in Reference Literature 2 below.

(Reference Literature 2) Nobuhiro Kaji, "Recent Research Trends in Japanese Morphological Analysis and Its Related Areas", Journal of Japan Society for Fuzzy Theory and Intelligent Informatics, Vol. 25, No. 6, pp. 174-183 (2013).

FIG. 18 is a diagram illustrating an example of a learning corpus stored in the storage unit 107.

The learning corpus illustrated in FIG. 18 is created using document data collected from the Web. Note that, any form of document data and any acquisition source thereof may be used as long as text data of the learning corpus is text data including a vocabulary to be analyzed.

For example, an internal document in an intranet may be used, or text data stored in a database may be used.

FIG. 19 is a diagram illustrating an example of a morphological analysis result, and illustrates a result of performing morphological analysis on text data f1. When the text data included in the learning corpus is input in the morphological analyzing unit 1601, as illustrated in FIG. 19, the morphological analyzing unit 1601 divides the text data in morpheme units, classifies the morpheme units into headers, and imparts a standard form, a part of speech, and a detailed part of speech to each of the morphemes.

Next, the modification analyzing unit 1602 performs modification analysis on the morphological analysis result from the morphological analyzing unit 1601 (step ST1702).

For example, the modification analyzing unit 1602 can perform modification analysis by a method described in Reference Literature 3 below.

(Reference Literature 3) Takao Shime, Masatoshi Tsuchiya, Suguru Matsuyoshi, Takehito Utsuro, and Satoshi Sato, "Automatic Detection of Japanese Compound Functional Expressions and its Application to Statistical Dependency Analysis", Natural Language Processing, Vol. 14, No. 5, pp. 167-197 (2007).

FIG. 20 is a diagram illustrating an example of a modification analysis result. In the example of FIG. 20, morphemes A1 and A2 are in a modification relationship, and each of morphemes A2, A3, and A4, and morpheme A5 are in a modification relationship. Upon analyzing such a modification relationship, the modification analyzing unit 1602 outputs the analysis result to the conjugation word standardizing unit 1603.

The conjugation word standardizing unit 1603 performs a conjugation word standardizing process on the morphological analysis result from the morphological analyzing unit 1601 (step ST1703). For example, the conjugation word standardizing unit 1603 refers to a part of speech of each morpheme in the morphological analysis result, and when the part of speech of the corresponding morpheme is a conjugation word such as a verb or an adjective, the conjugation word standardizing unit 1603 extracts a standard form of the morpheme. Then, the conjugation word standardizing unit 1603 creates data in which the morpheme of the conjugation word is replaced with the standard form among the morphemes in the morphological analysis result. This data is a conjugation word standardizing result.

FIG. 21 is a diagram illustrating an example of the conjugation word standardizing result. In the example of FIG. 21, among the morphological analysis results, morpheme A5 is a conjugation word in which the part of speech is an adjective. Therefore, as illustrated in FIG. 21, the conjugation word standardizing unit 1603 creates a conjugation word standardizing result in which morpheme A5 is replaced with standard form B1. A standard form is used for a header of a conjugation word in distributed representations of words learning data described later.

The negative expression integrating unit 1604 performs negative expression integration on the basis of the morphological analysis result from the morphological analyzing unit 1601, the modification analysis result from the modification analyzing unit 1602, and the conjugation word standardizing result from the conjugation word standardizing unit 1603 (step ST1704).

For example, the negative expression integrating unit 1604 refers to a morpheme string in a clause which is a unit of modification analysis in the conjugation word standardizing result, and when a morpheme of which the detailed part of speech is a negative auxiliary verb is included, the negative expression integrating unit 1604 removes the negative auxiliary verb from the conjugation word standardizing result. Then, the negative expression integrating unit 1604 integrates a conjugation word that becomes a negative expression by the negative auxiliary verb among the conjugation words in the clause and mark information indicating negation.

As described above, the negative expression integration is a process for integrating the conjugation word in the clause and the mark information instead of a morpheme of a negative expression in the conjugation word standardizing result.

Figure 22:
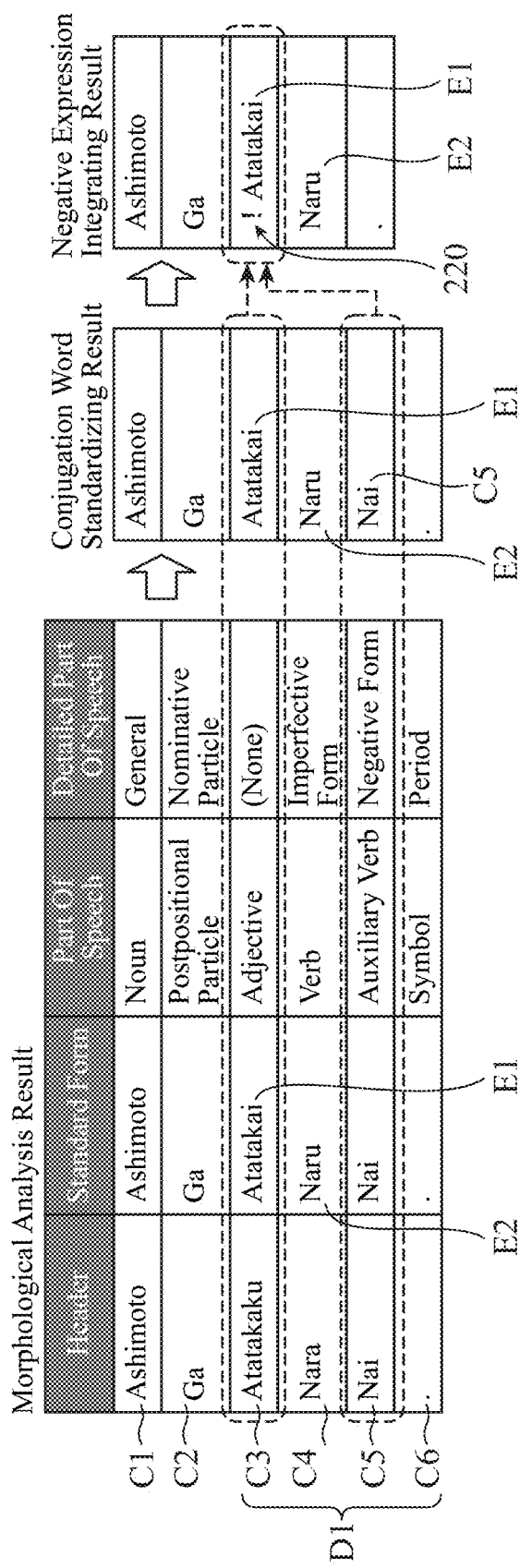
FIG. 22 is a diagram illustrating an example of a negative expression integrating result.

FIG. 22 is a diagram illustrating an example of the negative expression integrating result. The morphological analysis result illustrated in FIG. 22 includes morphemes C1 to C6. Clause D1 includes morpheme strings of morphemes C3 to C6. Since morphemes C3 and C4 are conjugation words, a header of morpheme C3 in the conjugation word standardizing result is replaced with its standard form E1, and a header of morpheme C4 is replaced with its standard form E2.

Since the morpheme string in clause D1 includes morpheme C5 of which the detailed part of speech is a negative auxiliary verb, the negative expression integrating unit 1604 removes morpheme C5 from the conjugation word standardizing result and imparts mark information 220 indicating negation to the head of a header of a conjugation word as a center of clause D1.

In the example of FIG. 22, a mark "!" which is mark information 220 is imparted to the front of a header of standard form E1 in clause D1, and mark information 220 and standard form E1 are integrated.

The adverb expression integrating unit 1605 performs adverb expression integration on the basis of the morphological analysis result from the morphological analyzing unit 1601, the modification analysis result from the modification analyzing unit 1602, and the conjugation word standardizing result from the conjugation word standardizing unit 1603 (step ST1705).

For example, the adverb expression integrating unit 1605 refers to a morpheme string in a clause which is a unit of modification analysis in the conjugation word standardizing result, and when a morpheme of which the part of speech is an adverb is included, the adverb expression integrating unit 1605 integrates the morpheme and a conjugation word which is a modifying destination thereof.

As described above, the adverb expression integration is a process for integrating a morpheme of an adverb and a conjugation word which is a modifying destination thereof in the conjugation word standardizing result.

Figure 23:
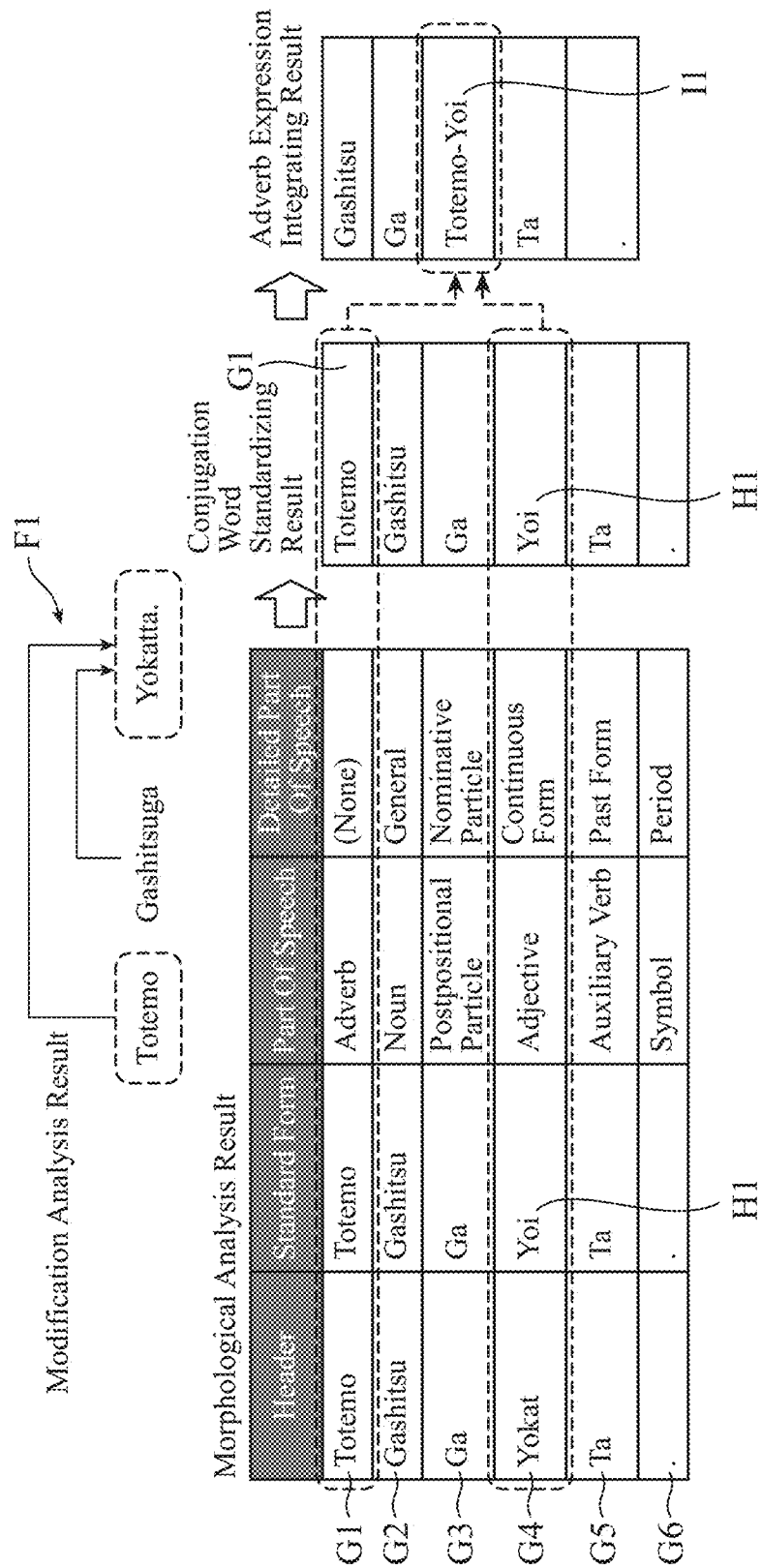
FIG. 23 is a diagram illustrating an example of an adverb expression integrating result.

FIG. 23 is a diagram illustrating an example of an adverb expression integrating result. Clause F1 included in the modification analysis result illustrated in FIG. 23 includes morpheme strings of morphemes G1 to G6.

Since morpheme G4 is a conjugation word, a header of morpheme G4 in the conjugation word standardizing result is replaced with its standard form H1.

Since a morpheme string in clause F1 includes morpheme G1 of which the part of speech is an adverb, the adverb expression integrating unit 1605 specifies a modifying destination of morpheme G1 on the basis of the modification analysis result, and integrates morpheme G1 and standard form H1 of morpheme G4 which is the modifying destination thereof. As a header of the integration result, for example, word/phrase I1 in which a header of morpheme G1 and a header of standard form H1 are connected by a hyphen "-" indicating integration is set.

The learning unit 1606 learns distributed representations of words data using the morphological analysis result, the modification analysis result, the conjugation word standardizing result, the negative expression integrating result, and the adverb expression integrating result, described above, as learning data (step ST1706).

For example, the learning unit 1606 can perform learning by a method described in Reference Literature 4 below. By this method, distributed representations of words are learned using an appearance probability of another word appearing around a certain word in the learning data.

(Reference Literature 4) Tomas Mikolov, Kai Chen, Greg Corrado, and Jeffrey Dean, "Efficient Estimation of Word Representations in Vector Space", Proceedings of Workshop at ICLR, 2013.

As described above, the data analyzer 100 according to the first embodiment selects a dimension of a word embedding depending on a viewpoint of analysis, and compresses a word embedding corresponding to an analysis target word/phrase in the selected dimension. As a result, even when a pair of antonyms used in similar contexts is designated as analysis viewpoint words/phrases, discriminability between a word/phrase group semantically close to one word/phrase of the pair and a word/phrase group semantically close to the other word/phrase can be enhanced.

In the data analyzer 100 according to the first embodiment, the data creating unit 106 analyzes morphemes of text data in a learning corpus and modification between the morphemes, replaces a morpheme which is a conjugation word in the analysis result with a standard form of the conjugation word, integrates negative expressions in a clause, integrates an adverb and a modifying destination thereof in the clause to create learning data, and creates distributed representations of words data by learning using the learning data.

By analyzing the distributed representations of words data created in this way, it is possible to analyze the strength (degree) of expression with an adjective or an adjective verb.

Second Embodiment

Figure 24:
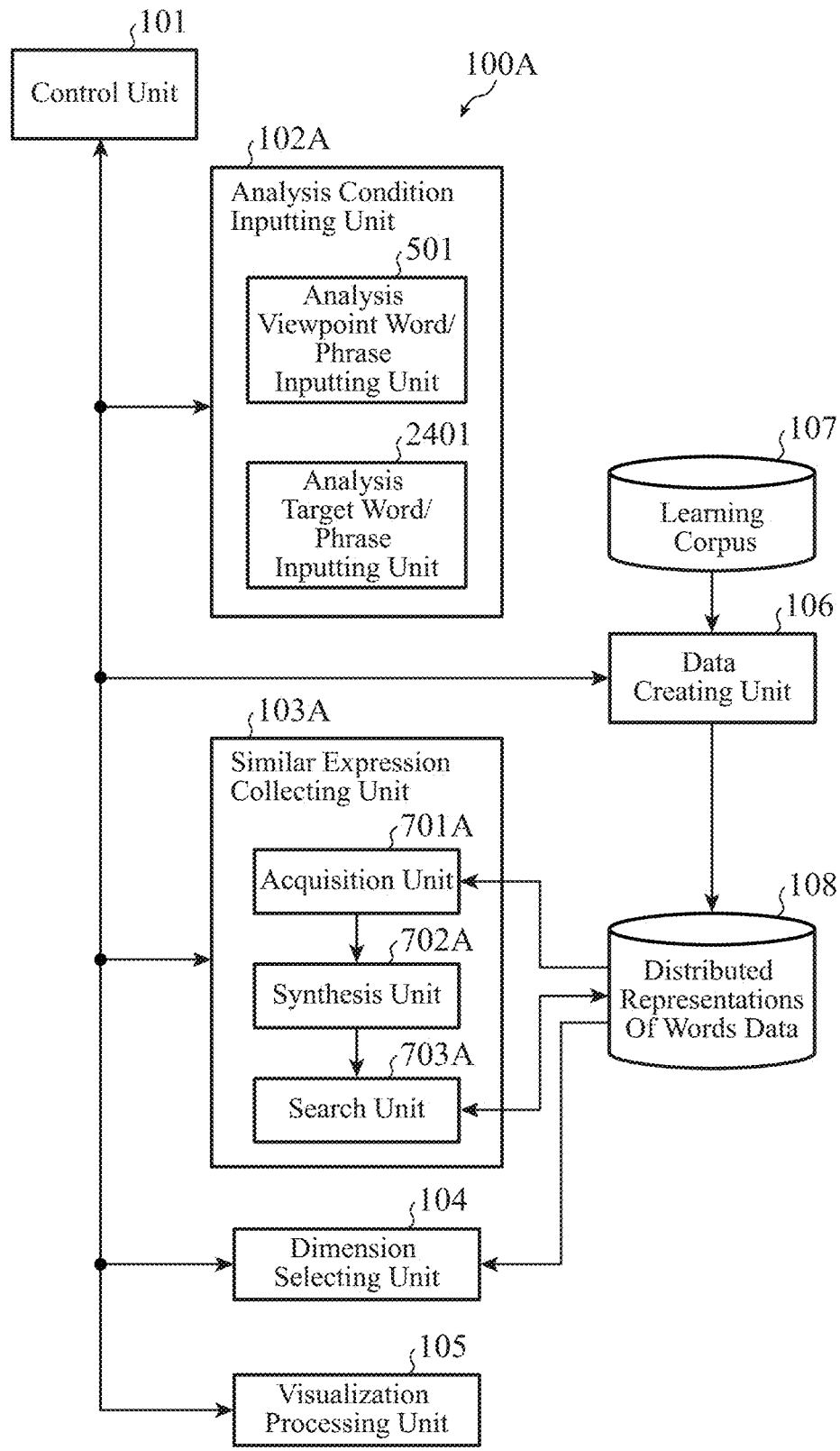
FIG. 24 is a block diagram illustrating a configuration of a data analyzer according to a second embodiment of the present invention.

FIG. 24 is a block diagram illustrating a configuration of a data analyzer 100A according to a second embodiment of the present invention. The same components as those in FIG. 1 are denoted by the same reference numerals, and description thereof is omitted.

The data analyzer 100A includes a control unit 101, an analysis condition inputting unit 102A, a similar expression collecting unit 103A, a dimension selecting unit 104, a visualization processing unit 105, and a data creating unit 106.

The analysis condition inputting unit 102A includes an analysis viewpoint word/phrase inputting unit 501 and an analysis target word/phrase inputting unit 2401. The similar expression collecting unit 103A includes an acquisition unit 701A, a synthesis unit 702A, and a search unit 703A.

The analysis viewpoint word/phrase inputting unit 501 receives an input of an analysis viewpoint word/phrase. The analysis target word/phrase inputting unit 2401 receives an input of a word/phrase to be analyzed.

The word/phrase to be analyzed is a word/phrase on which analysis such as dimension selection and compression is performed, and corresponds to a word/phrase collected by the similar expression collecting unit 103 in the first embodiment.

Hereinafter, a word/phrase to be analyzed is referred to as an analysis target word/phrase.

The similar expression collecting unit 103A collects, from distributed representations of words data, a word embedding corresponding to an analysis viewpoint word/phrase, a word/phrase of an expression similar to the analysis target word/phrase, and a word embedding corresponding to the word/phrase. The acquisition unit 701A acquires, from distributed representations of words data stored in the storage unit 108, a word embedding corresponding to each of an analysis viewpoint word/phrase and an analysis target word/phrase. The synthesis unit 702A creates a synthetic vector of a word embedding group corresponding to an analysis target word/phrase acquired by the acquisition unit 701A. The search unit 703A searches for distributed representations of words data of an expression similar to an analysis target word/phrase from pieces of distributed representations of words data stored in the storage unit 108 using the synthetic vector as a search key.

Each of functions of the control unit 101, the analysis condition inputting unit 102A, the similar expression collecting unit 103A, the dimension selecting unit 104, the visualization processing unit 105, and the data creating unit 106 in the data analyzer 100A is implemented by a processing circuit. That is, the data analyzer 100A includes a processing circuit for executing these functions. The processing circuit may be dedicated hardware or a CPU for executing a program stored in a memory as illustrated in FIGS. 2 and 3.

Figure 25:
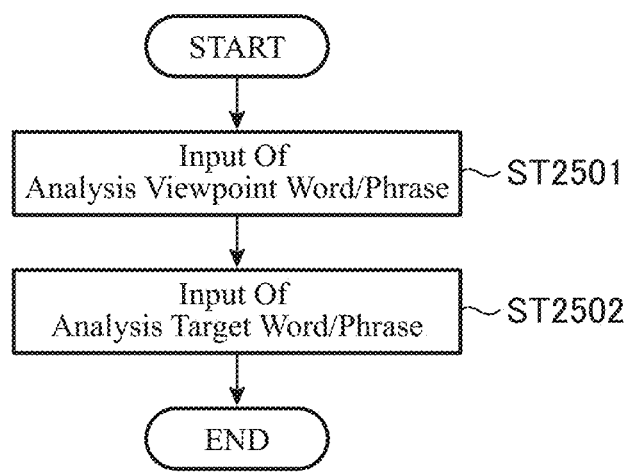
FIG. 25 is a flowchart illustrating an operation of an analysis condition inputting unit in the second embodiment.

FIG. 25 is a flowchart illustrating an operation of the analysis condition inputting unit 102A.

In step ST2501, the analysis viewpoint word/phrase inputting unit 501 receives an input of an analysis viewpoint word/phrase. In step ST2502, the analysis target word/phrase inputting unit 2401 receives an input of an analysis target word/phrase.

Note that FIG. 25 illustrates a case where the input process of an analysis viewpoint word/phrase is executed before the input process of an analysis target word/phrase, but the input process of an analysis target word/phrase may be executed before the input process of an analysis viewpoint word/phrase, or both processes may be executed in parallel.

For example, the analysis viewpoint word/phrase inputting unit 501 and the analysis target word/phrase inputting unit 2401 output input screen information for inputting an analysis viewpoint word/phrase and an analysis target word/phrase to the display 204, and the display 204 displays an input screen based on the input screen information.

On the basis of this input screen, an analysis worker inputs an analysis viewpoint word/phrase and an analysis target word/phrase depending on a purpose of analysis to the data analyzer 100A using the input device 203.

Figure 26A:
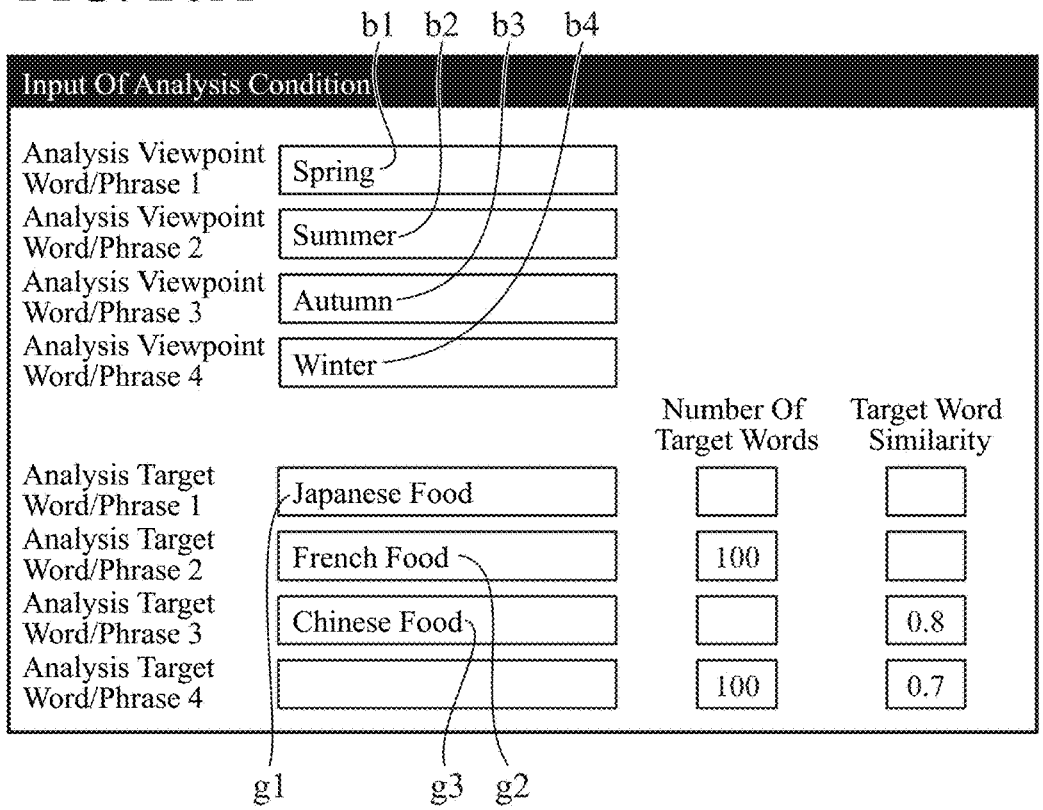
FIG. 26A is a diagram illustrating an input screen (example 1) for an analysis viewpoint word/phrase and an analysis target word/phrase.

FIG. 26A is a diagram illustrating an input screen (example 1) for an analysis viewpoint word/phrase and an analysis target word/phrase.

The input screen illustrated in FIG. 26A includes a plurality of input columns in each of which an analysis viewpoint word/phrase is input and a plurality of input columns in each of which an analysis target word/phrase is input, and with respect to the corresponding analysis target word/phrase, an input column for the number of target words and an input column for target word similarity are provided. The number of target words is a threshold for the number of words/phrases each collected as a word/phrase of an expression similar to an analysis target word/phrase. The target word similarity is a threshold for a cosine distance between a word embedding corresponding to an analysis target word/phrase and a word embedding corresponding to a word/phrase collected as a word/phrase of the similar expression. These are data for defining a scope of analysis.

In the example of FIG. 26A, words b1 to b4 are input in input columns for analysis viewpoint words/phrases 1 to 4, and words/phrases g1 to g3 are input in input columns for analysis target words/phrases 1 to 3, respectively.

Since "100" is input in an input column for the number of target words corresponding to analysis target word/phrase 2, 100 or less words/phrases each having an expression similar to word/phrase g2 which is analysis target word/phrase 2 are collected.

Since "0.8" is input in an input column for target word similarity corresponding to analysis target word/phrase 3, for word/phrase g3 which is analysis target word/phrase 3, a word/phrase corresponding to a word embedding having a cosine distance equal to or less than 0.8 is collected as a word/phrase of an expression similar to word/phrase g3.

Incidentally, when a numerical value is not input in an input column for the number of target words or an input column for target word similarity, a pre-defined default value is used.

When numerical values are input in both an input column for the number of target words and an input column for target word similarity, either one may be used with priority.

Figure 26B:
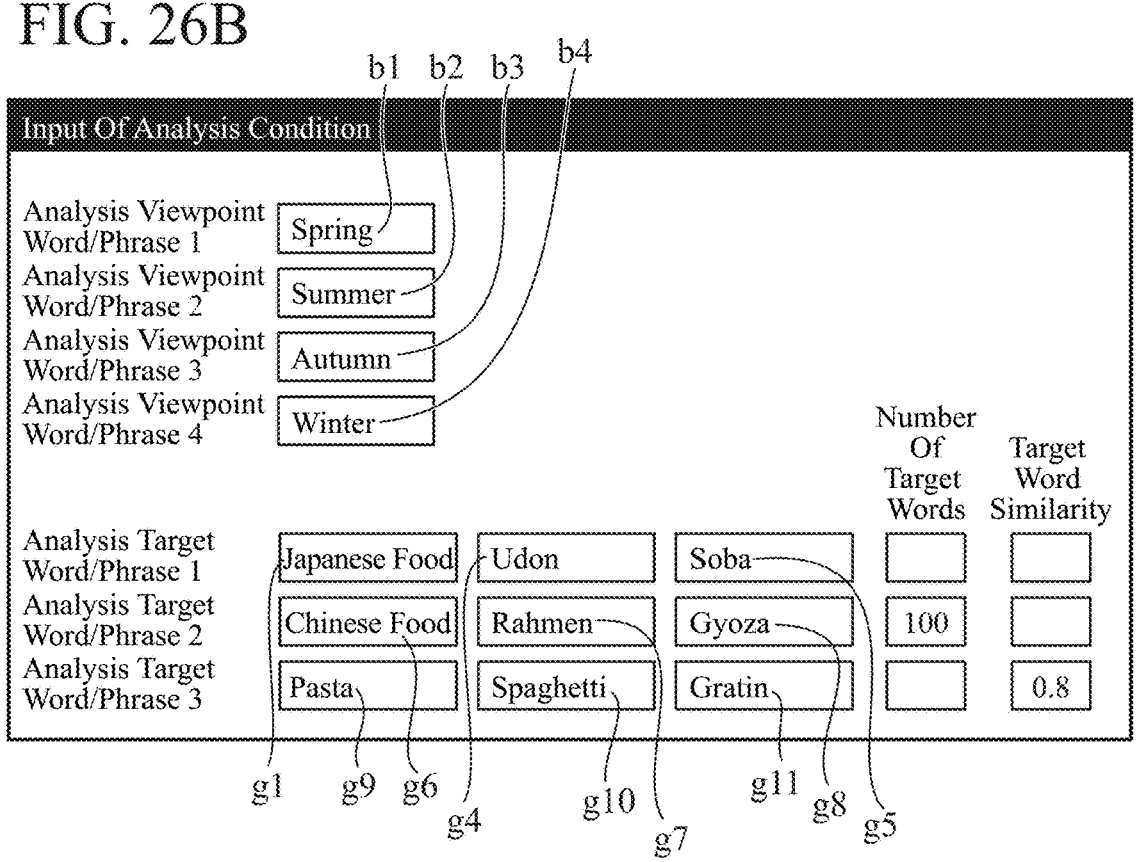
FIG. 26B is a diagram illustrating an input screen (example 2) for an analysis viewpoint word/phrase and an analysis target word/phrase.

FIG. 26B is a diagram illustrating an input screen (example 2) for an analysis viewpoint word/phrase and an analysis target word/phrase.

The input screen illustrated in FIG. 26B includes a plurality of input columns in each of which an analysis viewpoint word/phrase is input and a plurality of input columns in each of which an analysis target word/phrase is input, and with respect to the corresponding analysis target word/phrase, an input column for the number of target words and an input column for target word similarity are provided.

In the example of FIG. 26B, words b1 to b4 are input in input columns for analysis viewpoint words/phrases 1 to 4, respectively. Words/phrases g1, g4, and g5 are input in three input columns for analysis target word/phrase 1, words/phrases g6 to g8 are input in three input columns for analysis target word/phrase 2, and words/phrases g9 to g11 are input in three input columns for analysis target word/phrase 3.

Since "100" is input in an input column for the number of target words corresponding to analysis target word/phrase 2, 100 or less words/phrases each having an expression similar to a corresponding one of words/phrases g6 to g8 which are analysis target word/phrase 2 are collected.

Since "0.8" is input in an input column for target word similarity corresponding to analysis target word/phrase 3, for each of words/phrases g9 to g11 which are analysis target word/phrase 3, a word/phrase corresponding to a word embedding having a cosine distance equal to or less than 0.8 is collected as a word/phrase of an expression similar to a corresponding one of words/phrases g9 to g11.

Incidentally, when a numerical value is not input in an input column for the number of target words or an input column for target word similarity, a pre-defined default value is used.

When numerical values are input in both an input column for the number of target words and an input column for target word similarity, either one may be used with priority.

Figure 27:
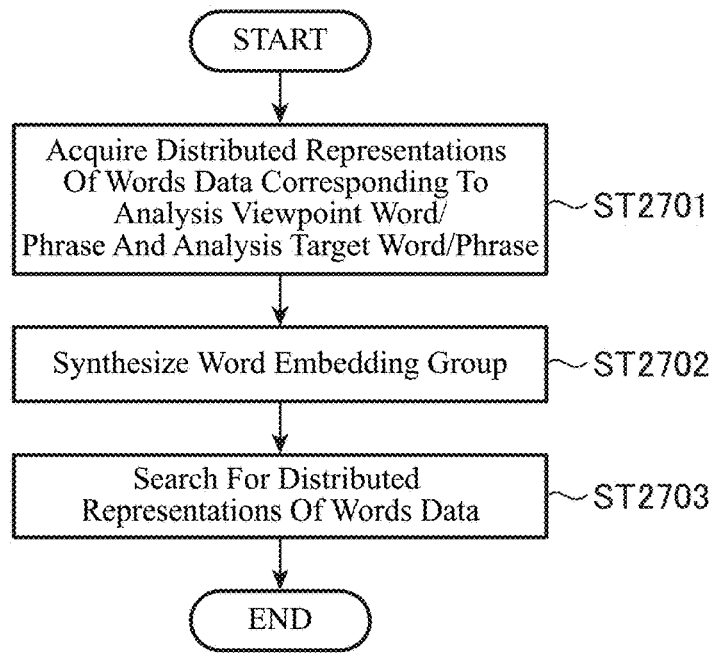
FIG. 27 is a flowchart illustrating an operation of a similar expression collecting unit in the second embodiment.

FIG. 27 is a flowchart illustrating an operation of the similar expression collecting unit 103A.

First, the acquisition unit 701A acquires a word embedding corresponding to an analysis viewpoint word/phrase and a word embedding corresponding to an analysis target word/phrase from distributed representations of words data stored in the storage unit 108 (step ST2701).

For example, on the basis of an analysis viewpoint word/phrase input in step ST2501, the acquisition unit 701A acquires a word embedding corresponding to the analysis viewpoint word/phrase by searching for a word/phrase in the header column 802 in the distributed representations of words data. Furthermore, on the basis of an analysis target word/phrase input in step ST2502, the acquisition unit 701A acquires a word embedding corresponding to the analysis target word/phrase by searching for a word/phrase in the header column 802 in the distributed representations of words data.

The word embedding corresponding to the analysis viewpoint word/phrase is used in processes from step ST1001 to step ST1004 illustrated in FIG. 11 of the first embodiment.

Next, the synthesis unit 702A synthesizes a word embedding group corresponding to an analysis target word/phrase acquired by the acquisition unit 701A (step ST2702).

For example, the synthesis unit 702A divides word embeddings in word embedding group Wo[j] corresponding to an analysis target word/phrase by their respective norms to normalize their respective lengths, divides the sum of these word embeddings by its norm to obtain a normalized vector, and outputs the normalized vector as a synthetic vector.

The search unit 703A searches for distributed representations of words data of an expression similar to an analysis target word/phrase from pieces of distributed representations of words data stored in the storage unit 108 using the synthetic vector obtained in step ST2702 as a search key (step ST2703).

For example, the search unit 703A acquires, from the storage unit 108, word embeddings in each of which a cosine distance from the synthetic vector is equal to or less than a threshold, and also acquires and lists words/phrases in the header column 802 corresponding to the respective word embeddings. A list of the words/phrases thus acquired and the word embeddings corresponding to the words/phrases is a similar expression collecting result. Processes after the similar expression collection are similar to those described in the first embodiment. Note that a word/phrase of an expression similar to an analysis target word/phrase collected by the similar expression collecting unit 103A and a word embedding corresponding to the word/phrase are used in a process after step ST1005 illustrated in FIG. 11 of the first embodiment.

As described above, in the data analyzer 100A according to the second embodiment, the analysis condition inputting unit 102A includes the analysis viewpoint word/phrase inputting unit 501 and the analysis target word/phrase inputting unit 2401.

The similar expression collecting unit 103A collects vector data corresponding to a word/phrase received by the analysis viewpoint word/phrase inputting unit 501, and collects a word/phrase of an expression similar to a word/phrase received by the analysis target word/phrase inputting unit 2401, and vector data corresponding to the word/phrase. Since such a configuration makes an input of an analysis condition including an analysis viewpoint word/phrase and an input of an analysis condition including an analysis target word/phrase independent of each other, a more accurate analysis condition can be input.

Third Embodiment

Figure 28:
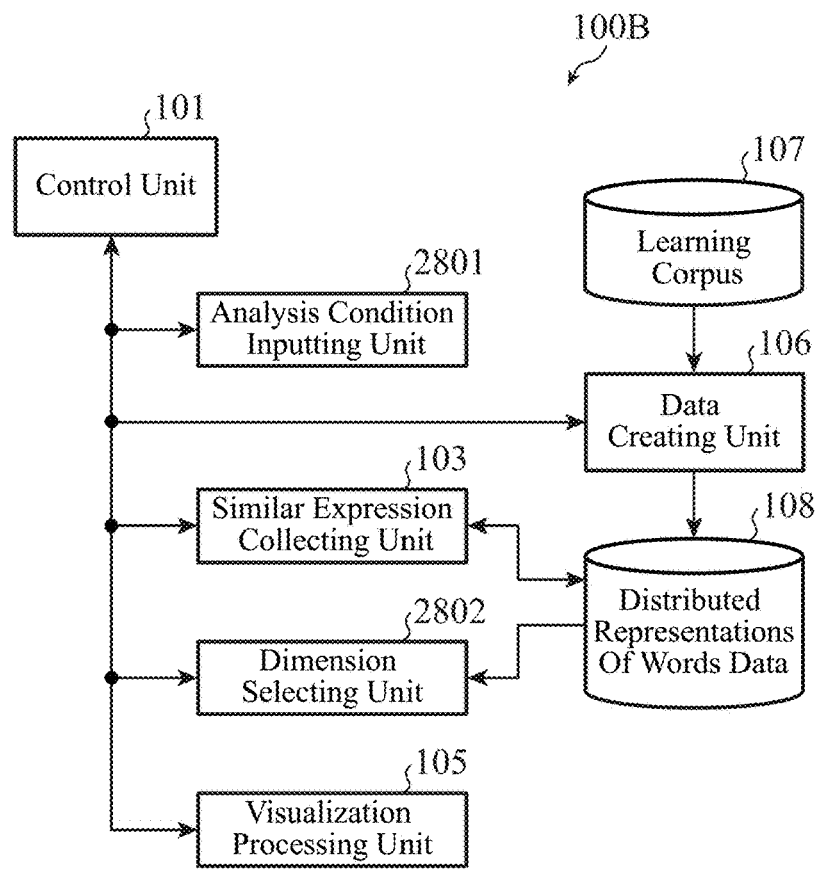
FIG. 28 is a block diagram illustrating a configuration of a data analyzer according to a third embodiment of the present invention.

FIG. 28 is a block diagram illustrating a configuration of a data analyzer 100B according to a third embodiment of the present invention. The same components as those in FIG. 1 are denoted by the same reference numerals, and description thereof is omitted.

The data analyzer 100B includes a control unit 101, an analysis condition inputting unit 2801, a similar expression collecting unit 103, a dimension selecting unit 2802, a visualization processing unit 105, and a data creating unit 106.

The analysis condition inputting unit 2801 receives an ordered input of a viewpoint of analysis. The ordered input of a viewpoint of analysis is to input words/phrases having intermediate meanings from a certain word/phrase to its antonym in order. For example, on an input screen for an analysis viewpoint word/phrase of the analysis condition inputting unit 2801, it is possible to input "very hot", "a little hot", "a little cold", and "very cold" as analysis viewpoint words/phrases.

The dimension selecting unit 2802 selects a dimension of a word embedding depending on words/phrases having intermediate meanings up to an antonym input in order as a viewpoint of analysis, and compresses a word embedding corresponding to a word/phrase collected by the similar expression collecting unit 103 in the selected dimension.

Each of functions of the control unit 101, the analysis condition inputting unit 2801, the similar expression collecting unit 103, the dimension selecting unit 2802, the visualization processing unit 105, and the data creating unit 106 in the data analyzer 100B is implemented by a processing circuit. That is, the data analyzer 100B includes a processing circuit for executing these functions. The processing circuit may be dedicated hardware or a CPU for executing a program stored in a memory as illustrated in FIGS. 2 and 3.

Figure 29:
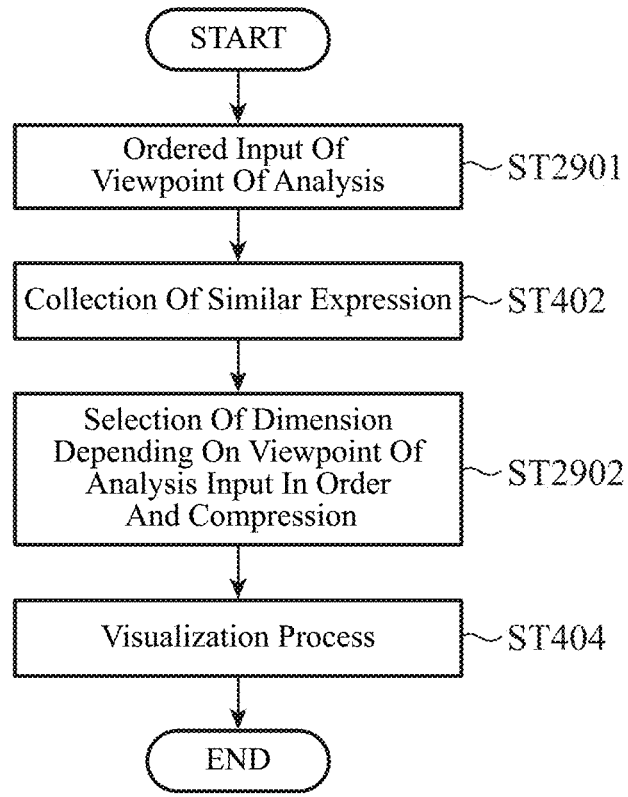
FIG. 29 is a flowchart illustrating an operation of the data analyzer according to the third embodiment.

FIG. 29 is a flow chart illustrating an operation of the data analyzer 100B, and indicates a series of processes from an input of an analysis condition to visualization of an analysis result.

In FIG. 29, steps of performing the same processes as those in FIG. 4 are denoted by the same step numbers, and description thereof is omitted.

First, the analysis condition inputting unit 2801 receives an ordered input of a viewpoint of analysis (step ST2901). For example, the analysis condition inputting unit 2801 outputs input screen information for inputting a viewpoint of analysis in order to a display 204, and the display 204 thereby displays an input screen. An analysis worker inputs an analysis condition using the input device 203 on the basis of the input screen. The analysis condition inputting unit 2801 outputs information input using the input device 203 to the similar expression collecting unit 103 and the dimension selecting unit 2802.

Figure 30:
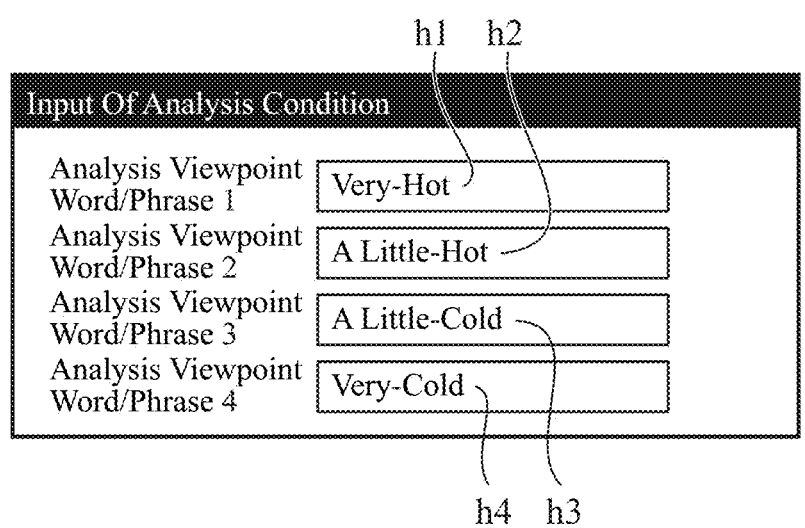
FIG. 30 is a diagram illustrating an input screen for an analysis viewpoint word/phrase in the third embodiment.

FIG. 30 is a diagram illustrating an example of an input screen for an analysis viewpoint word/phrase provided by the analysis condition inputting unit 2801. The input screen illustrated in FIG. 30 includes a plurality of input columns for sequentially inputting respective words/phrases having intermediate meanings from analysis viewpoint word/phrase 1 to analysis viewpoint word/phrase 4 which is an antonym thereof.

For example, when word/phrase h1 is input in an input column of analysis viewpoint word/phrase 1, words/phrases h2 and h3 having intermediate meanings are input in input columns for analysis viewpoint words/phrases 2 and 3 so as to gradually indicate opposite meanings, respectively. Then, word/phrase h4 which is an antonym of word/phrase h1 is input in an input column for analysis viewpoint word/phrase 4.

In step ST2902, the dimension selecting unit 2802 selects a dimension of a word embedding depending on words/phrases input in step ST2901, and compresses a word embedding corresponding to a word/phrase collected from distributed representations of words data by the similar expression collecting unit 103 in the selected dimension.

Figures 31, 32:
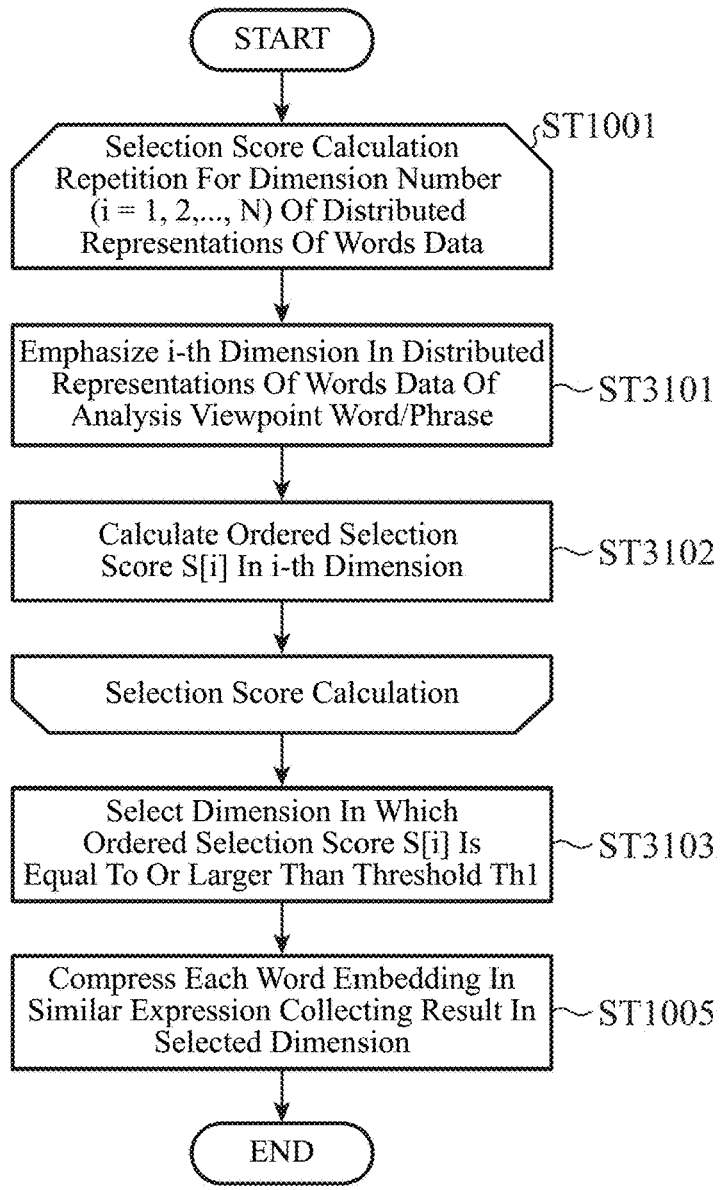
FIG. 31 is a flowchart illustrating an operation of a dimension selecting unit in the third embodiment.
FIG. 32 is a diagram illustrating a score table in the third embodiment.

FIG. 31 is a flowchart illustrating an operation of the dimension selecting unit 2802 and illustrates details of a process in step ST2902. In FIG. 31, steps of performing the same processes as those in FIG. 11 are denoted by the same step numbers, and description thereof is omitted.

Note that step ST1001 is a process of repeating selection score calculation.

That is, the dimension selecting unit 2802 repeats processes in steps ST3101 and ST3102 for the dimension number N of distributed representations of words data.

In step ST3101, the dimension selecting unit 2802 emphasizes the i-th dimension of distributed representations of words data corresponding to an analysis viewpoint word/phrase input in step ST2901.

For example, the dimension selecting unit 2802 creates a new word embedding in which an element in the i-th dimension of a word embedding corresponding to an analysis viewpoint word/phrase is emphasized by multiplying the element in the i-th dimension by a predetermined number. When four analysis viewpoint words/phrases of "very hot", "a little hot", "a little cold", and "very cold" are input, the dimension selecting unit 2802 creates new word embeddings W[i1]', W[i2]', W[i3]', and W[i4]' by multiplying the i-th elements from word embeddings W[i1], W[i2], W[i3], and W[i4] corresponding to these words/phrases by a predetermined number, respectively.

In step ST3102, the dimension selecting unit 2802 calculates ordered selection score S[i] in the i-th dimension.

First, the dimension selecting unit 2802 calculates (n−1) division point vectors between word embeddings W[i1]' and W[i4]' corresponding to "very hot" and "very cold" constituting a pair of antonyms obtained in step ST2901. The pair of antonyms corresponds to a word/phrase set in the first place as analysis viewpoint word/phrase 1 and a word/phrase set in the last place as analysis viewpoint word/phrase 4 in the ordered input of a viewpoint of analysis. n is the number of analysis viewpoint words/phrases input in step ST2901.

Since n=4 is satisfied, the dimension selecting unit 2802 calculates Wd[1] and Wd[2] which are vectors obtained by dividing a distance between word embeddings W[i1]' and W[i4]' into three.

Subsequently, the dimension selecting unit 2802 calculates a cosine distance between each of word embeddings W[i1]', W[i2]', W[i3]', and W[i4]' and each of Wd[1] and Wd[2] which are (n−1) division point vectors.

Furthermore, the dimension selecting unit 2802 calculates ordered selection score S[i] on the basis of a score table which is a standard for judging how much an order relation of words/phrases in an ordered input of a viewpoint of analysis is reproduced.

FIG. 32 is a diagram illustrating an example of the score table. In the score table illustrated in FIG. 32, an ordered selection score is associated with each of conditions A to D.

As condition A, it is descried that a word embedding having the smallest cosine distance from word embedding W[i1] corresponding to a word/phrase set in the first place in an ordered input of a viewpoint of analysis is a word embedding W[i2] corresponding to a word/phrase set in the second place.

As condition B, it is described that a word embedding closest to a (n−1) division point vector Wd[x] is a word embedding W[i(x+1)] corresponding to a word/phrase set in the (x+1)-th place.

As condition C, it is described that a word embedding having the smallest cosine distance from a word embedding W[im] corresponding to a word/phrase set in the last place in an ordered input of a viewpoint of analysis is a word embedding W[i(m−1)] corresponding to a word/phrase set in the second place from the last.

Condition D includes a case other than conditions A to C.

Since conditions A to C each indicate an order relation of words/phrases in an ordered input of a viewpoint of analysis, the dimension selecting unit 2802 adds+1 to ordered selection score S[i] when a vector created in step ST3102 satisfies any of conditions A to C.

Meanwhile, since the condition D does not satisfy the order relation of words/phrases in the ordered input of a viewpoint of analysis, the dimension selecting unit 2802 adds −1 to ordered selection score S[i] when a vector created in step ST3102 satisfies condition D.

In step ST3103, the dimension selecting unit 2802 selects a dimension corresponding to an ordered selection score equal to or larger than threshold Th1 among ordered selection scores S[i] in respective dimensions calculated in the selection score calculating process, and lists the number i of the selected dimension to obtain a list L=[i1, i2, . . . , ix].

As described above, in the data analyzer 100B according to the third embodiment, the analysis condition inputting unit 2801 receives an ordered input of words/phrases having intermediate meanings up to an antonym as a viewpoint of analysis. The dimension selecting unit 2802 selects a dimension of a word embedding depending on words/phrases having intermediate meanings up to an antonym input in order as a viewpoint of analysis, and compresses a word embedding corresponding to a word/phrase collected by the similar expression collecting unit 103 in the selected dimension. Since such a configuration makes it possible to select a dimension giving priority to a semantic order relation of words/phrases input as a viewpoint of analysis, a more accurate analysis condition can be input.

Fourth Embodiment

Figure 33:
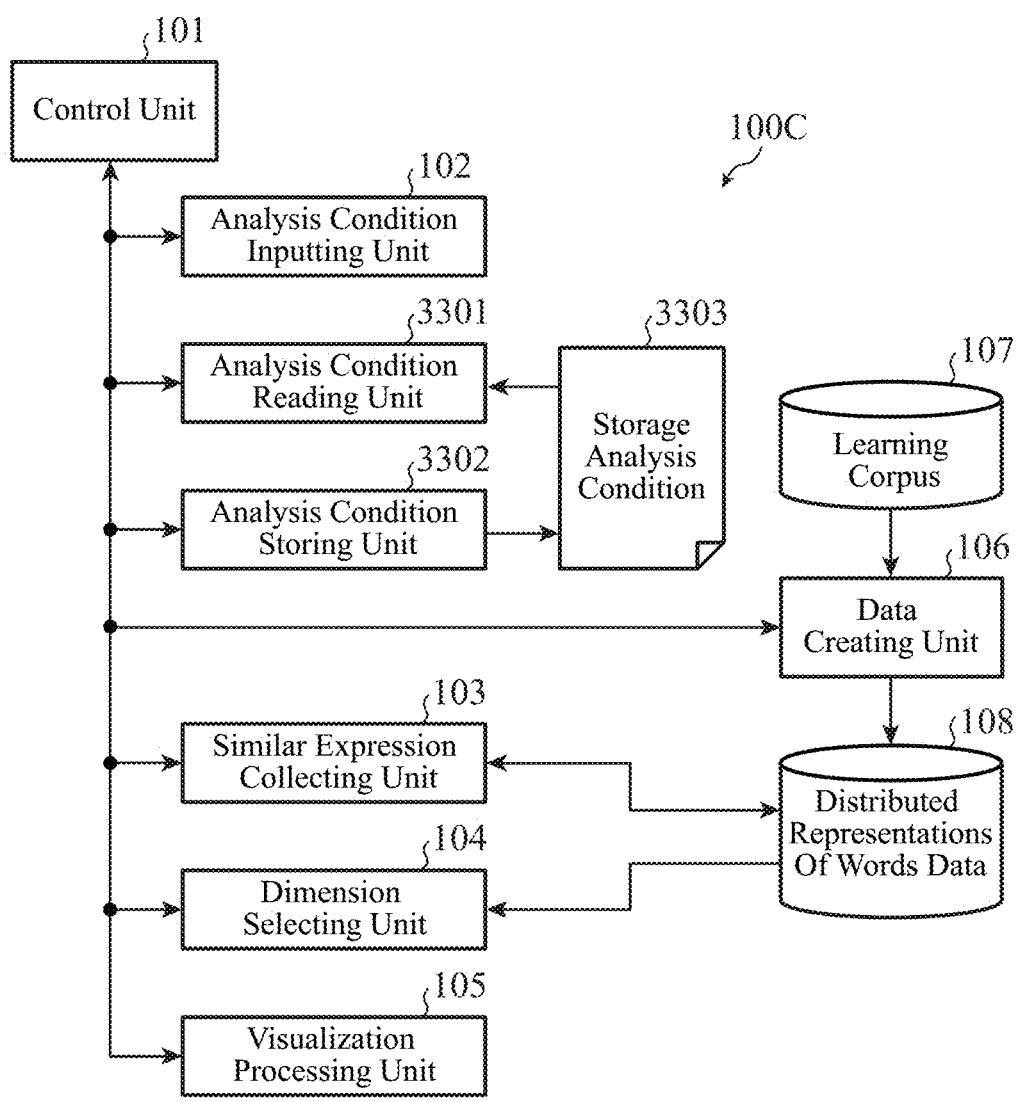
FIG. 33 is a block diagram illustrating a configuration of a data analyzer according to a fourth embodiment of the present invention.

FIG. 33 is a block diagram illustrating a configuration of a data analyzer 100C according to a fourth embodiment of the present invention. The same components as those in FIG. 1 are denoted by the same reference numerals, and description thereof is omitted.

As illustrated in FIG. 33, the data analyzer 100C includes a control unit 101, an analysis condition inputting unit 102, an analysis condition reading unit 3301, an analysis condition storing unit 3302, a similar expression collecting unit 103, a dimension selecting unit 104, a visualization processing unit 105, and a data creating unit 106.

The analysis condition reading unit 3301 reads a stored analysis condition (hereinafter referred to as a storage analysis condition 3303) and sets the analysis condition for an input of the analysis condition inputting unit 102.

The analysis condition storing unit 3302 stores the storage analysis condition 3303. For example, the analysis condition storing unit 3302 stores the storage analysis condition 3303 in a memory included in the data analyzer 100C. The analysis condition storing unit 3302 may store the storage analysis condition 3303 in an external storage device capable of reading data by the analysis condition reading unit 3301.

The storage analysis condition 3303 is a condition designated to be reused among analysis conditions including analysis viewpoint words/phrases received by the analysis condition inputting unit 102. For example, an analysis worker designates whether or not to reuse a condition.

Each of functions of the control unit 101, the analysis condition inputting unit 102, the analysis condition reading unit 3301, the analysis condition storing unit 3302, the similar expression collecting unit 103, the dimension selecting unit 104, the visualization processing unit 105, and the data creating unit 106 in the data analyzer 100C is implemented by a processing circuit.

That is, the data analyzer 100C includes a processing circuit for executing these functions. The processing circuit may be dedicated hardware or a CPU for executing a program stored in a memory as illustrated in FIGS. 2 and 3.

Figure 34:
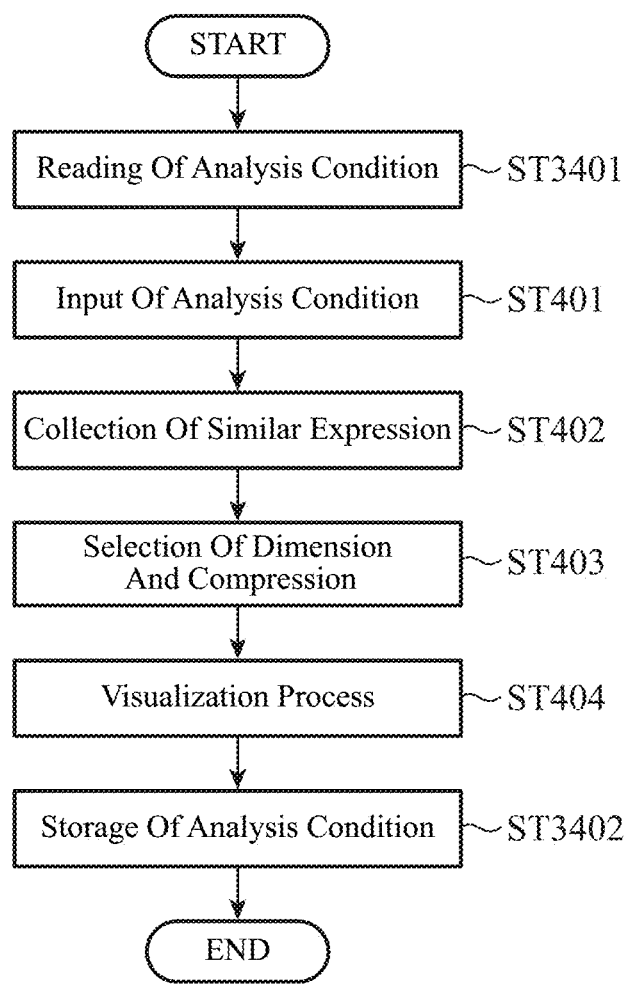
FIG. 34 is a flowchart illustrating an operation of the data analyzer according to the fourth embodiment.

FIG. 34 is a flow chart illustrating an operation of the data analyzer 100C, and indicates a series of processes from an input of an analysis condition to storage of the analysis condition.

In FIG. 34, steps of performing the same processes as those in FIG. 4 are denoted by the same step numbers, and description thereof is omitted.

In step ST3401, the analysis condition reading unit 3301 reads the storage analysis condition 3303 and sets the storage analysis condition 3303 for an input of the analysis condition inputting unit 102. This process is performed in a case where an analysis worker designates the storage analysis condition 3303 to be read when starting analysis work. The analysis condition inputting unit 102 treats the storage analysis condition 3303 set by the analysis condition reading unit 3301 as an analysis condition for which an input has been received, and outputs the storage analysis condition 3303 to the similar expression collecting unit 103 and the dimension selecting unit 104. As a result, processes from step ST402 to step ST404 are performed in a similar manner to the first embodiment.

Note that the analysis condition inputting unit 102 may edit the storage analysis condition 3303 as necessary.

When editing is not necessary, the analysis condition inputting unit 102 outputs the storage analysis condition 3303 to the similar expression collecting unit 103 and the dimension selecting unit 104 without editing the storage analysis condition 3303.

In step ST3402, the analysis condition storing unit 3302 stores an analysis condition received by the analysis condition inputting unit 102 as the storage analysis condition 3303.

For example, the analysis condition storing unit 3302 stores the storage analysis condition 3303 in accordance with an analysis worker's storage instruction input using the input device 203.

The storage analysis condition 3303 may have any form as long as being able to be reused in the next analysis or thereafter. For example, the storage analysis condition 3303 may be data described in tab-delimited text format or a structured document in XML format.

As described above, the data analyzer 100C according to the fourth embodiment includes the analysis condition reading unit 3301 and the analysis condition storing unit 3302. The analysis condition storing unit 3302 stores the storage analysis condition 3303 including an analysis viewpoint word/phrase. The analysis condition reading unit 3301 reads the storage analysis condition 3303 and sets the storage analysis condition 3303 for an input of the analysis condition inputting unit 102.

With this configuration, the storage analysis condition 3303 can be repeatedly used, and it is not necessary to input a complicated analysis condition at each analysis.

Fifth Embodiment

Figure 35:
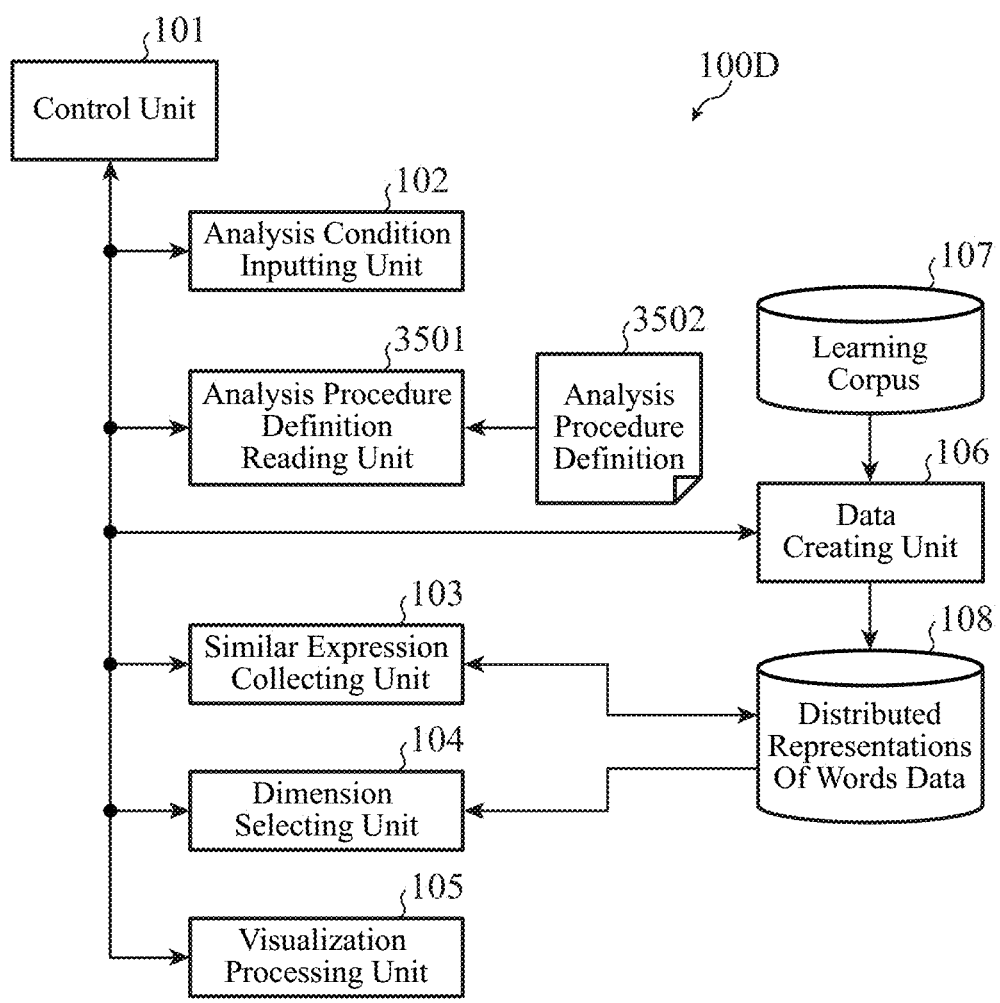
FIG. 35 is a block diagram illustrating a configuration of a data analyzer according to a fifth embodiment of the present invention.

FIG. 35 is a block diagram illustrating a configuration of a data analyzer 100D according to a fifth embodiment of the present invention. The same components as those in FIG. 1 are denoted by the same reference numerals, and description thereof is omitted.

As illustrated in FIG. 35, the data analyzer 100D includes a control unit 101, an analysis condition inputting unit 102, an analysis procedure definition reading unit 3501, a similar expression collecting unit 103, a dimension selecting unit 104, a visualization processing unit 105, and a data creating unit 106.

The analysis procedure definition reading unit 3501 is a definition information reading unit for reading the analysis procedure definition 3502 and setting the analysis procedure definition 3502 in the control unit 101.

For example, the analysis procedure definition reading unit 3501 may read the analysis procedure definition 3502 input by an analysis worker and set the analysis procedure definition 3502 in the control unit 101.

The analysis procedure definition reading unit 3501 may read the analysis procedure definition 3502 from an external storage device and set the analysis procedure definition 3502 in the control unit 101.

The analysis procedure definition 3502 is definition information in which a plurality of different analysis conditions is defined, the conditions including analysis viewpoint words/phrases.

Note that the analysis procedure definition 3502 may have any format as long as being information in which a plurality of analysis conditions is defined. For example, the analysis procedure definition 3502 may be data described in tab-delimited text format or a structured document in XML format.

Each of functions of the control unit 101, the analysis condition inputting unit 102, the analysis procedure definition reading unit 3501, the similar expression collecting unit 103, the dimension selecting unit 104, the visualization processing unit 105, and the data creating unit 106 in the data analyzer 100D is implemented by a processing circuit. That is, the data analyzer 100D includes a processing circuit for executing these functions.

The processing circuit may be dedicated hardware or a CPU for executing a program stored in a memory as illustrated in FIGS. 2 and 3.

Figure 36:
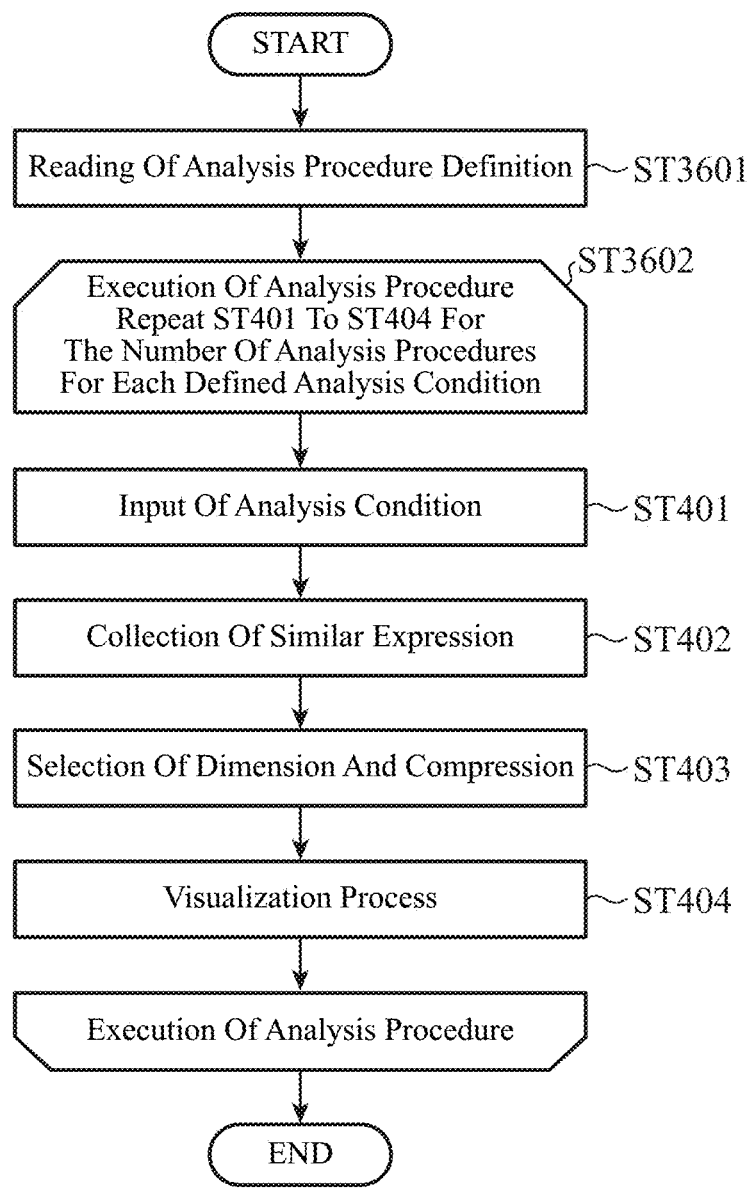
FIG. 36 is a flowchart illustrating an operation of the data analyzer according to the fifth embodiment.

FIG. 36 is a flow chart illustrating an operation of the data analyzer 100D, and indicates a series of processes from an input of an analysis condition to visualization of an analysis result.

In FIG. 36, steps of performing the same processes as those in FIG. 4 are denoted by the same step numbers, and description thereof is omitted.

In step ST3601, the analysis procedure definition reading unit 3501 reads the analysis procedure definition 3502 and sets the analysis procedure definition 3502 in the control unit 101.

For example, an analysis worker inputs the analysis procedure definition 3502 in the data analyzer 100D using the input device 203. The analysis procedure definition reading unit 3501 reads the input analysis procedure definition 3502 and develops the analysis procedure definition 3502 on a memory used for information processing of the control unit 101.

In step ST3602, the control unit 101 controls the analysis condition inputting unit 102, the similar expression collecting unit 103, the dimension selecting unit 104, and the visualization processing unit 105 so that the analysis condition inputting unit 102, the similar expression collecting unit 103, the dimension selecting unit 104, and the visualization processing unit 105 operate for each analysis condition defined in the analysis procedure definition 3502. That is, the analysis condition inputting unit 102, the similar expression collecting unit 103, the dimension selecting unit 104, and the visualization processing unit 105 are controlled by the control unit 101, and sequentially perform an analysis procedure for each analysis condition defined in the analysis procedure definition 3502.

As a result, processes from step ST401 to step ST404 are repeated for the number of analysis procedures for each analysis condition defined in the analysis procedure definition 3502.

When the control unit 101 is removed from the data analyzer 100D, the analysis procedure definition reading unit 3501 may set the analysis procedure definition 3502 for each of the analysis condition inputting unit 102, the similar expression collecting unit 103, the dimension selecting unit 104, and the visualization processing unit 105.

Even in this case, each of the analysis condition inputting unit 102, the similar expression collecting unit 103, the dimension selecting unit 104, and the visualization processing unit 105 can sequentially perform an analysis procedure for each analysis condition defined in the analysis procedure definition 3502.

As described above, the data analyzer 100D according to the fifth embodiment includes the analysis procedure definition reading unit 3501 for reading the analysis procedure definition 3502 in which a plurality of analysis conditions is defined.

The analysis condition inputting unit 102, the similar expression collecting unit 103, the dimension selecting unit 104, and the visualization processing unit 105 perform processes in accordance with each of the plurality of analysis conditions defined in the analysis procedure definition 3502 read by the analysis procedure definition reading unit 3501.

Such a configuration makes it possible to perform analysis under an analysis condition obtained by combining a plurality of analysis conditions. A complicated analysis condition can be used repeatedly.

Incidentally, in the present invention, the embodiments can be freely combined with one another, any component in the embodiments can be modified, or any component in the embodiments can be omitted within the scope of the invention.

INDUSTRIAL APPLICABILITY

Even when a pair of antonyms is used in similar contexts, the data analyzer according to the present invention can enhance discriminability between a word/phrase group semantically close to one word/phrase of the pair and a word/phrase group semantically close to the other word/phrase, and therefore can be used for a search device of a text data base.

REFERENCE SIGNS LIST 100, 100A to 100D: Data analyzer, 101: Control unit, 102, 102A, 2801: Analysis condition inputting unit, 103, 103A: Similar expression collecting unit, 104, 2802: Dimension selecting unit, 105: Visualization processing unit, 106: Data creating unit, 107, 108: Storage unit, 201: Processing circuit, 202: Storage device, 203: Input device, 204: Display, 220: Mark information, 301: Processor, 302: Memory, 501: Analysis viewpoint word/phrase inputting unit, 701, 701A: Acquisition unit, 702, 702A: Synthesis unit, 703, 703A: Search unit, 801: ID column, 802: Header column, 803: Word embedding column, 1301: Distance matrix creating unit, 1302: Positioning coordinate calculating unit, 1303: Positioning result drawing unit, 1601: morphological analyzing unit, 1602: Modification analyzing unit, 1603: Conjugation word standardizing unit, 1604: Negative expression integrating unit, 1605: Adverb expression integrating unit, 1606: Learning unit, 2401: Analysis target word/phrase inputting unit, 3301: Analysis condition reading unit, 3302: Analysis condition storing unit, 3303: Storage analysis condition, 3501: Analysis procedure definition reading unit, 3502: Analysis procedure definition.

The invention claimed is:

1. A data analyzer comprising:

a processor to execute a program; and a memory to store the program which, when executed by the processor, performs processes of, receiving an input of a word or phrase as a viewpoint of analysis;

searching a distributed representations of words database for a term of an expression similar to a word or phrase input as the viewpoint of analysis, the distributed representations of words database being stored on a computer-readable storage device and including a plurality of records for a plurality of terms, respectively, each of the plurality of terms being a word or phrase, each of the plurality of records including fixed-dimensional vector data assigned to the corresponding word or phrase as a result of machine learning;

extracting, as a result of the search, the record of the term of the similar expression from the distributed representations of words database;

selecting a dimension of vector data depending on the word or phrase input as the viewpoint of analysis, and compressing the vector data assigned to the corresponding word or phrase of the extracted record in the selected dimension; and causing a display device to display a visualized analysis of data stored in the distributed representations of words database based on the vector data dimensionally compressed.

2. The data analyzer according to claim 1, wherein the processes further includes:

receiving an input of a word or phrase as an analysis target; and collecting, from the distributed representations of words data, vector data corresponding to the word or phrase received as the target analysis, a word or phrase of an expression similar to the word/phrase received, and vector data corresponding to the word/phrase of the similar expression.

3. The data analyzer according to claim 1, wherein the processes further includes:

receiving an ordered input of terms having intermediate meanings up to an antonym as a viewpoint of analysis, each of the received terms being a word or phrase, and selecting a dimension of vector data depending on the terms having intermediate meanings up to the antonym, input in order as the viewpoint of analysis, and compressing vector data corresponding to a collected word or phrase in the selected dimension.

4. The data analyzer according to claim 1, the processes further comprising:

storing an analysis condition including a word or phrase input as a viewpoint of analysis; and reading the analysis condition stored and setting the analysis condition for an input.

5. The data analyzer according to claim 1, the processes further comprising reading definition information in which a plurality of analysis conditions is defined, wherein the processor performs the processes in accordance with each of the plurality of analysis conditions defined in the definition information read.

6. A data analyzer comprising:

a processor to execute a program; and a memory to store the program which, when executed by the processor, performs processes of, receiving an input of a word or phrase as a viewpoint of analysis;

searching a distributed representations of words database for a term of an expression similar to a word or phrase input as the viewpoint of analysis, the distributed representations of words database being stored on a computer-readable storage device and including a plurality of records for a plurality of terms, respectively, each of the plurality of terms being a word or phrase, each of the plurality of records including fixed-dimensional vector data assigned to the corresponding word or phrase as a result of machine learning;

extracting, as a result of the search, the record of the term of the similar expression from the distributed representations of words database; and selecting a dimension of vector data depending on the word or phrase input as the viewpoint of analysis, and compressing the vector data assigned to the corresponding word or phrase of the extracted record in the selected dimension, wherein the machine learning, which creates the vector data assigned to the respective plurality of terms in the distributed representations of words database, uses learning data that is created by analyzing morphemes of text data in a learning corpus and modification between the morphemes, replacing a morpheme which is a conjugation word in a result of the analysis with a standard form of the conjugation word, integrating negative expressions in a clause, and integrating an adverb and a modifying destination of the adverb in the clause to create learning data.

7. A data analysis method comprising:

utilizing a processor to:

receive an input of a word or phrase as a viewpoint of analysis;

search a distributed representations of words database for a term of an expression similar to a word or phrase input as the viewpoint of analysis, the distributed representations of words database being stored on a computer-readable storage device and including a plurality of records for a plurality of terms, respectively, each of the plurality of terms being a word or phrase, each of the plurality of records including fixed-dimensional vector data assigned to the corresponding word or phrase as a result of machine learning;

extract, as a result of the search, the record of the term of the similar expression from the distributed representations of words database;

selecting a dimension of vector data depending on the word or phrase input as the viewpoint of analysis, and compressing the vector data assigned to the corresponding word or phrase of the extracted record in the selected dimension; and causing a display device to display a visualized analysis of data stored in the distributed representations of words database based on the vector data dimensionally compressed.

8. A data analysis method comprising:

utilizing a processor to:

receive an input of a word or phrase as a viewpoint of analysis;

search a distributed representations of words database for a term of an expression similar to a word or phrase input as the viewpoint of analysis, the distributed representations of words database being stored on a computer-readable storage device and including a plurality of records for a plurality of terms, respectively, each of the plurality of terms being a word or phrase, each of the plurality of records including fixed-dimensional vector data assigned to the corresponding word or phrase as a result of machine learning;

extract, as a result of the search, the record of the term of the similar expression from the distributed representations of words database; and select a dimension of vector data depending on the word or phrase input as the viewpoint of analysis, and compressing the vector data assigned to the corresponding word or phrase of the extracted record in the selected dimension, wherein the machine learning, which creates the vector data assigned to the respective plurality of terms in the distributed representations of words database, uses learning data that is created by analyzing morphemes of text data in a learning corpus and modification between the morphemes, replacing a morpheme which is a conjugation word in a result of the analysis with a standard form of the conjugation word, integrating negative expressions in a clause, and integrating an adverb and a modifying destination of the adverb in the clause to create learning data.

* * * * *